(12) United States Patent
Owens et al.

(10) Patent No.: US 10,464,009 B2
(45) Date of Patent: *Nov. 5, 2019

(54) ADSORBENT-INCORPORATED POLYMER FIBERS IN PACKED BED AND FABRIC CONTACTORS, AND METHODS AND DEVICES USING SAME

(71) Applicant: ExxonMobil Upstream Research Company, Spring, TX (US)

(72) Inventors: Tracie L. Owens, Houston, TX (US); Daniel P. Leta, Flemington, NJ (US)

(73) Assignee: ExxonMobil Upstream Research Company, Spring, TX (US)

( * ) Notice: Subject to any disclaimer, the term of this patent is extended or adjusted under 35 U.S.C. 154(b) by 14 days.

This patent is subject to a terminal disclaimer.

(21) Appl. No.: 15/625,633

(22) Filed: Jun. 16, 2017

(65) Prior Publication Data

US 2017/0282114 A1   Oct. 5, 2017

Related U.S. Application Data

(63) Continuation of application No. 14/941,798, filed on Nov. 16, 2015, now Pat. No. 9,713,787.

(Continued)

(51) Int. Cl.
*B01D 53/04* (2006.01)
*B01J 20/28* (2006.01)
(Continued)

(52) U.S. Cl.
CPC ......... *B01D 53/0462* (2013.01); *B01D 53/02* (2013.01); *B01D 53/047* (2013.01);
(Continued)

(58) Field of Classification Search
CPC .. B01D 53/0462; B01D 53/047; B01D 53/04; B01D 53/0473; B01D 2253/108;
(Continued)

(56) References Cited

U.S. PATENT DOCUMENTS 1,868,138 A   7/1932   Fisk
3,103,425 A   9/1963   Meyer
(Continued)

FOREIGN PATENT DOCUMENTS

CA   2297590   9/2000
CA   2237103   12/2001
(Continued)

OTHER PUBLICATIONS

U.S. Appl. No. 15/284,960, filed Oct. 4, 2016, Fowler et al.
(Continued)

*Primary Examiner* — Frank M Lawrence, Jr.
(74) *Attorney, Agent, or Firm* — ExxonMobil Upstream Research Company—Law Department

(57) ABSTRACT

The embodiments of the disclosure relate generally to adsorbent beds, adsorbent contactors, and methods of using same. The disclosure includes polymer filaments that include an adsorbent particle, such as a zeolite, metal oxide, metal organic framework. A plurality of fibers composed of the polymer filaments can be formed into an adsorbent bed for use in pressure swing and/or temperature swing adsorption processes. The plurality of fibers can be packed into a bed randomly, spirally wound, or woven into a fabric that can be formed into a contacting structure. The adsorbent particle can be contained within the polymer filament and can interact with a medium having a component for adsorption by being in fluid communication with the medium via tortuous pathways within the polymer.

33 Claims, 7 Drawing Sheets

Related U.S. Application Data

(60) Provisional application No. 62/089,902, filed on Dec. 10, 2014.

(51) Int. Cl.

| | | |
|---|---|---|
| *B01J 20/20* | (2006.01) | |
| *B01J 20/26* | (2006.01) | |
| *B01D 53/02* | (2006.01) | |
| *B01D 53/047* | (2006.01) | |
| *B01J 20/18* | (2006.01) | |

(52) U.S. Cl.
CPC .......... *B01D 53/0473* (2013.01); *B01J 20/18* (2013.01); *B01J 20/20* (2013.01); *B01J 20/26* (2013.01); *B01J 20/262* (2013.01); *B01J 20/28023* (2013.01); *B01J 20/28026* (2013.01); *B01J 20/28028* (2013.01); *B01J 20/28033* (2013.01); *B01J 20/28038* (2013.01); *B01D 2253/108* (2013.01); *B01D 2253/25* (2013.01); *B01D 2257/302* (2013.01); *B01D 2257/304* (2013.01); *B01D 2257/40* (2013.01); *B01D 2257/404* (2013.01); *B01D 2257/504* (2013.01); *B01D 2257/80* (2013.01); *B01D 2258/0283* (2013.01); *B01D 2258/05* (2013.01); *B01D 2258/06* (2013.01); *Y02C 10/08* (2013.01)

(58) Field of Classification Search
CPC .......... B01D 2253/25; B01D 2257/302; B01D 2257/304; B01D 2257/40; B01D 2257/404; B01D 2257/504; B01D 2257/80; B01D 2258/0283; B01D 2258/05; B01D 2258/06; B01J 20/18; B01J 20/26; B01J 20/28023; B01J 20/28026; B01J 20/28038
USPC .......... 95/96, 117, 139, 148, 137, 129, 136; 96/121, 126, 134, 135, 146, 153, 154
See application file for complete search history.

(56) References Cited

U.S. PATENT DOCUMENTS

| | | |
|---|---|---|
| 3,124,152 A | 3/1964 | Payne |
| 3,142,547 A | 7/1964 | Marsh |
| 3,508,758 A | 4/1970 | Strub |
| 3,602,247 A | 8/1971 | Bunn et al. |
| 3,788,036 A | 1/1974 | Lee et al. |
| 3,967,464 A | 7/1976 | Cormier et al. |
| 4,187,092 A | 2/1980 | Woolley |
| 4,261,815 A | 4/1981 | Kelland |
| 4,324,565 A | 4/1982 | Benkmann |
| 4,325,565 A | 4/1982 | Winchell |
| 4,329,162 A | 5/1982 | Pitcher, Jr. |
| 4,340,398 A | 7/1982 | Doshi et al. |
| 4,386,947 A | 6/1983 | Mizuno et al. |
| 4,445,441 A | 5/1984 | Tanca |
| 4,461,630 A | 7/1984 | Cassidy et al. |
| 4,496,376 A | 1/1985 | Hradek |
| 4,705,627 A | 11/1987 | Miwa et al. |
| 4,711,968 A | 12/1987 | Oswald et al. |
| 4,737,170 A | 4/1988 | Searle |
| 4,770,676 A | 9/1988 | Sircar et al. |
| 4,783,205 A | 11/1988 | Searle |
| 4,784,672 A | 11/1988 | Sircar |
| 4,790,272 A | 12/1988 | Woolenweber |
| 4,814,146 A | 3/1989 | Brand et al. |
| 4,816,039 A | 3/1989 | Krishnamurthy et al. |
| 4,877,429 A | 10/1989 | Hunter |
| 4,977,745 A | 12/1990 | Heichberger |
| 5,110,328 A | 5/1992 | Yokota et al. |
| 5,125,934 A | 6/1992 | Krishnamurthy et al. |
| 5,169,006 A | 12/1992 | Stelzer |
| 5,174,796 A | 12/1992 | Davis et al. |
| 5,224,350 A | 7/1993 | Mehra |
| 5,234,472 A | 8/1993 | Krishnamurthy et al. |
| 5,292,990 A | 3/1994 | Kantner et al. |
| 5,306,331 A | 4/1994 | Auvil et al. |
| 5,354,346 A | 10/1994 | Kumar |
| 5,365,011 A | 11/1994 | Ramachandran et al. |
| 5,370,728 A | 12/1994 | LaSala et al. |
| 5,486,227 A | 1/1996 | Kumar et al. |
| 5,547,641 A | 8/1996 | Smith et al. |
| 5,565,018 A | 10/1996 | Baksh et al. |
| 5,672,196 A | 9/1997 | Acharya et al. |
| 5,700,310 A | 12/1997 | Bowman et al. |
| 5,733,451 A | 3/1998 | Coellner et al. |
| 5,735,938 A | 4/1998 | Baksh et al. |
| 5,750,026 A | 5/1998 | Gadkaree et al. |
| 5,769,928 A | 6/1998 | Leavitt |
| 5,792,239 A | 8/1998 | Reinhold, III et al. |
| 5,807,423 A | 9/1998 | Lemcoff et al. |
| 5,811,616 A | 9/1998 | Holub et al. |
| 5,827,358 A | 10/1998 | Kulish et al. |
| 5,906,673 A | 5/1999 | Reinhold, III et al. |
| 5,912,426 A | 6/1999 | Smolarek et al. |
| 5,924,307 A | 7/1999 | Nenov |
| 5,935,444 A | 8/1999 | Johnson et al. |
| 5,951,744 A * | 9/1999 | Rohrbach .......... B01J 20/28023 261/104 |
| 5,968,234 A | 10/1999 | Midgett, II et al. |
| 5,976,221 A | 11/1999 | Bowman et al. |
| 5,997,617 A | 12/1999 | Czabala et al. |
| 6,007,606 A | 12/1999 | Baksh et al. |
| 6,011,192 A | 1/2000 | Baker et al. |
| 6,023,942 A | 2/2000 | Thomas et al. |
| 6,053,966 A | 4/2000 | Moreau et al. |
| 6,063,161 A | 5/2000 | Keefer et al. |
| 6,096,115 A | 8/2000 | Kleinberg |
| 6,099,621 A | 8/2000 | Ho |
| 6,129,780 A | 10/2000 | Millet et al. |
| 6,136,222 A | 10/2000 | Friesen et al. |
| 6,147,126 A | 11/2000 | DeGeorge et al. |
| 6,152,991 A | 11/2000 | Ackley |
| 6,156,101 A | 12/2000 | Naheiri |
| 6,171,371 B1 | 1/2001 | Derive et al. |
| 6,176,897 B1 | 1/2001 | Keefer |
| 6,179,900 B1 | 1/2001 | Behling et al. |
| 6,183,538 B1 | 2/2001 | Naheiri |
| 6,194,079 B1 | 2/2001 | Hekal |
| 6,210,466 B1 | 4/2001 | Whysall et al. |
| 6,231,302 B1 | 5/2001 | Bonardi |
| 6,245,127 B1 | 6/2001 | Kane et al. |
| 6,284,021 B1 | 9/2001 | Lu et al. |
| 6,311,719 B1 | 11/2001 | Hill et al. |
| 6,345,954 B1 | 2/2002 | Al-Himyary et al. |
| 6,398,853 B1 | 6/2002 | Keefer et al. |
| 6,402,813 B2 | 6/2002 | Monereau et al. |
| 6,406,523 B1 | 6/2002 | Connor et al. |
| 6,425,938 B1 | 7/2002 | Xu et al. |
| 6,432,379 B1 | 8/2002 | Heung |
| 6,436,171 B1 | 8/2002 | Wang et al. |
| 6,444,012 B1 | 9/2002 | Dolan et al. |
| 6,444,014 B1 | 9/2002 | Mullhaupt et al. |
| 6,444,523 B1 | 9/2002 | Fan et al. |
| 6,451,095 B1 | 9/2002 | Keefer et al. |
| 6,457,485 B2 | 10/2002 | Hill et al. |
| 6,471,939 B1 | 10/2002 | Boix et al. |
| 6,488,747 B1 | 12/2002 | Keefer et al. |
| 6,497,750 B2 | 12/2002 | Butwell et al. |
| 6,500,234 B1 | 12/2002 | Ackley et al. |
| 6,500,241 B2 | 12/2002 | Reddy |
| 6,500,404 B1 | 12/2002 | Camblor Fernandez et al. |
| 6,503,299 B2 | 1/2003 | Baksh et al. |
| 6,506,351 B1 | 1/2003 | Jain et al. |
| 6,514,318 B2 | 2/2003 | Keefer |
| 6,514,319 B2 | 2/2003 | Keefer et al. |
| 6,517,609 B1 | 2/2003 | Monereau et al. |
| 6,531,516 B2 | 3/2003 | Davis et al. |
| 6,533,846 B1 | 3/2003 | Keefer et al. |
| 6,565,627 B1 | 5/2003 | Golden et al. |

(56) References Cited

U.S. PATENT DOCUMENTS

| | | |
|---|---|---|
| 6,565,635 B2 | 5/2003 | Keefer et al. |
| 6,565,825 B2 | 5/2003 | Ohji et al. |
| 6,572,678 B1 | 6/2003 | Wijmans et al. |
| 6,579,341 B2 | 6/2003 | Baker et al. |
| 6,593,541 B1 | 7/2003 | Herren |
| 6,595,233 B2 | 7/2003 | Pulli |
| 6,605,136 B1 | 8/2003 | Graham et al. |
| 6,607,584 B2 | 8/2003 | Moreau et al. |
| 6,630,012 B2 | 10/2003 | Wegeng et al. |
| 6,631,626 B1 | 10/2003 | Hahn |
| 6,641,645 B1 | 11/2003 | Lee et al. |
| 6,651,645 B1 | 11/2003 | Nunez Suarez |
| 6,660,064 B2 | 12/2003 | Golden et al. |
| 6,660,065 B2 | 12/2003 | Byrd et al. |
| 6,692,626 B2 | 2/2004 | Keefer et al. |
| 6,712,087 B2 | 3/2004 | Hill et al. |
| 6,742,507 B2 | 6/2004 | Connor et al. |
| 6,746,515 B2 | 6/2004 | Wegeng et al. |
| 6,752,852 B1 | 6/2004 | Jacksier et al. |
| 6,770,120 B2 | 8/2004 | Neu et al. |
| 6,773,225 B2 | 8/2004 | Yuri et al. |
| 6,802,889 B2 | 10/2004 | Graham et al. |
| 6,814,771 B2 | 11/2004 | Scardino et al. |
| 6,835,354 B2 | 12/2004 | Woods et al. |
| 6,840,985 B2 | 1/2005 | Keefer |
| 6,866,950 B2 | 3/2005 | Connor et al. |
| 6,889,710 B2 | 5/2005 | Wagner |
| 6,890,376 B2 | 5/2005 | Arquin et al. |
| 6,893,483 B2 | 5/2005 | Golden et al. |
| 6,902,602 B2 | 6/2005 | Keefer et al. |
| 6,916,358 B2 | 7/2005 | Nakamura et al. |
| 6,918,953 B2 | 7/2005 | Lomax, Jr. et al. |
| 6,921,597 B2 | 7/2005 | Keefer et al. |
| 6,974,496 B2 | 12/2005 | Wegeng et al. |
| 7,025,801 B2 | 4/2006 | Monereau |
| 7,027,929 B2 | 4/2006 | Wang |
| 7,029,521 B2 | 4/2006 | Johansson |
| 7,074,323 B2 | 7/2006 | Ghijsen |
| 7,077,891 B2 | 7/2006 | Jaffe et al. |
| 7,087,331 B2 | 8/2006 | Keefer et al. |
| 7,094,275 B2 | 8/2006 | Keefer et al. |
| 7,097,925 B2 | 8/2006 | Keefer et al. |
| 7,112,239 B2 | 9/2006 | Kimbara et al. |
| 7,117,669 B2 | 10/2006 | Kaboord et al. |
| 7,122,073 B1 | 10/2006 | Notaro et al. |
| 7,128,775 B2 | 10/2006 | Celik et al. |
| 7,132,007 B1 * | 11/2006 | von Blucher .......... B01D 53/02 95/90 |
| 7,144,016 B2 | 12/2006 | Gozdawa |
| 7,160,356 B2 | 1/2007 | Koros et al. |
| 7,160,367 B2 | 1/2007 | Babicki et al. |
| 7,166,149 B2 | 1/2007 | Dunne et al. |
| 7,172,645 B1 | 2/2007 | Pfister et al. |
| 7,189,280 B2 | 3/2007 | Alizadeh-Khiavi et al. |
| 7,250,073 B2 | 7/2007 | Keefer et al. |
| 7,250,074 B2 | 7/2007 | Tonkovich et al. |
| 7,255,727 B2 | 8/2007 | Monereau et al. |
| 7,258,725 B2 | 8/2007 | Ohmi et al. |
| 7,276,107 B2 | 10/2007 | Baksh et al. |
| 7,279,029 B2 | 10/2007 | Occhialini et al. |
| 7,285,350 B2 | 10/2007 | Keefer et al. |
| 7,297,279 B2 | 11/2007 | Johnson et al. |
| 7,311,763 B2 | 12/2007 | Neary |
| RE40,006 E | 1/2008 | Keefer et al. |
| 7,314,503 B2 | 1/2008 | Landrum et al. |
| 7,354,562 B2 | 4/2008 | Ying et al. |
| 7,387,849 B2 | 6/2008 | Keefer et al. |
| 7,390,350 B2 | 6/2008 | Weist, Jr. et al. |
| 7,404,846 B2 | 7/2008 | Golden et al. |
| 7,438,079 B2 | 10/2008 | Cohen et al. |
| 7,449,049 B2 | 11/2008 | Thomas et al. |
| 7,456,131 B2 | 11/2008 | Klett et al. |
| 7,510,601 B2 | 3/2009 | Whitley et al. |
| 7,527,670 B2 | 5/2009 | Ackley et al. |
| 7,553,568 B2 | 6/2009 | Keefer |
| 7,578,864 B2 | 8/2009 | Watanabe et al. |
| 7,604,682 B2 | 10/2009 | Seaton |
| 7,637,989 B2 | 12/2009 | Bong |
| 7,641,716 B2 | 1/2010 | Lomax, Jr. et al. |
| 7,645,324 B2 | 1/2010 | Rode et al. |
| 7,651,549 B2 | 1/2010 | Whitley |
| 7,674,319 B2 | 3/2010 | Lomax, Jr. et al. |
| 7,674,539 B2 | 3/2010 | Keefer et al. |
| 7,687,044 B2 | 3/2010 | Keefer et al. |
| 7,713,333 B2 | 5/2010 | Rege et al. |
| 7,717,981 B2 | 5/2010 | LaBuda et al. |
| 7,722,700 B2 | 5/2010 | Sprinkle |
| 7,731,782 B2 | 6/2010 | Kelley et al. |
| 7,740,687 B2 | 6/2010 | Reinhold, III |
| 7,744,676 B2 | 6/2010 | Leitmayr et al. |
| 7,744,677 B2 | 6/2010 | Barclay et al. |
| 7,758,051 B2 | 7/2010 | Roberts-Haritonov et al. |
| 7,758,988 B2 | 7/2010 | Keefer et al. |
| 7,763,098 B2 | 7/2010 | Alizadeh-Khiavi et al. |
| 7,763,099 B2 | 7/2010 | Verma et al. |
| 7,792,983 B2 | 9/2010 | Mishra et al. |
| 7,793,675 B2 | 9/2010 | Cohen et al. |
| 7,806,965 B2 | 10/2010 | Stinson |
| 7,819,948 B2 | 10/2010 | Wagner |
| 7,828,877 B2 | 11/2010 | Sawada et al. |
| 7,828,880 B2 | 11/2010 | Moriya et al. |
| 7,854,793 B2 | 12/2010 | Rarig et al. |
| 7,858,169 B2 | 12/2010 | Yamashita |
| 7,862,645 B2 | 1/2011 | Whitley et al. |
| 7,867,320 B2 | 1/2011 | Baksh et al. |
| 7,902,114 B2 | 3/2011 | Bowie et al. |
| 7,938,886 B2 | 5/2011 | Hershkowitz et al. |
| 7,947,118 B2 | 5/2011 | Rarig et al. |
| 7,947,120 B2 | 5/2011 | Deckman et al. |
| 7,959,720 B2 | 6/2011 | Deckman et al. |
| 8,016,918 B2 | 9/2011 | LaBuda et al. |
| 8,034,164 B2 | 10/2011 | Lomax, Jr. et al. |
| 8,071,063 B2 | 12/2011 | Reyes et al. |
| 8,128,734 B2 | 3/2012 | Song |
| 8,142,745 B2 | 3/2012 | Reyes et al. |
| 8,142,746 B2 | 3/2012 | Reyes et al. |
| 8,192,709 B2 | 6/2012 | Reyes et al. |
| 8,210,772 B2 | 7/2012 | Gillecriosd |
| 8,227,121 B2 | 7/2012 | Adams et al. |
| 8,262,773 B2 | 9/2012 | Northrop et al. |
| 8,262,783 B2 | 9/2012 | Stoner et al. |
| 8,268,043 B2 | 9/2012 | Celik et al. |
| 8,268,044 B2 | 9/2012 | Wright et al. |
| 8,272,401 B2 | 9/2012 | McLean |
| 8,287,629 B2 | 10/2012 | Fujita et al. |
| 8,319,090 B2 | 11/2012 | Kitamura |
| 8,337,594 B2 | 12/2012 | Corma Canos et al. |
| 8,361,200 B2 | 1/2013 | Sayari et al. |
| 8,361,205 B2 | 1/2013 | Desai et al. |
| 8,377,173 B2 | 2/2013 | Chuang |
| 8,444,750 B2 | 5/2013 | Deckman et al. |
| 8,470,395 B2 | 6/2013 | Khiavi et al. |
| 8,480,795 B2 | 7/2013 | Siskin et al. |
| 8,512,569 B2 | 8/2013 | Eaton et al. |
| 8,518,356 B2 | 8/2013 | Schaffer et al. |
| 8,529,662 B2 | 9/2013 | Kelley et al. |
| 8,529,663 B2 | 9/2013 | Reyes et al. |
| 8,529,664 B2 | 9/2013 | Deckman et al. |
| 8,529,665 B2 | 9/2013 | Manning et al. |
| 8,535,414 B2 | 9/2013 | Johnson et al. |
| 8,545,602 B2 | 10/2013 | Chance et al. |
| 8,551,444 B2 | 10/2013 | Agnihotri et al. |
| 8,573,124 B2 | 11/2013 | Havran et al. |
| 8,591,627 B2 | 11/2013 | Jain |
| 8,591,634 B2 | 11/2013 | Winchester et al. |
| 8,616,233 B2 | 12/2013 | McLean et al. |
| 8,657,922 B2 | 2/2014 | Yamawaki et al. |
| 8,673,059 B2 | 3/2014 | Leta et al. |
| 8,680,344 B2 | 3/2014 | Weston et al. |
| 8,715,617 B2 | 5/2014 | Genkin et al. |
| 8,752,390 B2 | 6/2014 | Wright et al. |
| 8,778,051 B2 | 7/2014 | Weist, Jr. et al. |
| 8,784,533 B2 | 7/2014 | Leta et al. |
| 8,784,534 B2 | 7/2014 | Kamakoti et al. |

(56) References Cited

U.S. PATENT DOCUMENTS

| | | |
|---|---|---|
| 8,784,535 B2 | 7/2014 | Ravikovitch et al. |
| 8,795,411 B2 | 8/2014 | Hufton et al. |
| 8,808,425 B2 | 8/2014 | Genkin et al. |
| 8,808,426 B2 | 8/2014 | Sundaram |
| 8,814,985 B2 | 8/2014 | Gerds et al. |
| 8,852,322 B2 | 10/2014 | Gupta et al. |
| 8,858,683 B2 | 10/2014 | Deckman |
| 8,875,483 B2 | 11/2014 | Wettstein |
| 8,906,138 B2 | 12/2014 | Rasmussen et al. |
| 8,921,637 B2 | 12/2014 | Sundaram et al. |
| 8,939,014 B2 | 1/2015 | Kamakoti et al. |
| 9,005,561 B2 | 4/2015 | Leta et al. |
| 9,017,457 B2 | 4/2015 | Tammera |
| 9,028,595 B2 | 5/2015 | Sundaram et al. |
| 9,034,078 B2 | 5/2015 | Wanni et al. |
| 9,034,079 B2 | 5/2015 | Deckman et al. |
| 9,050,553 B2 | 6/2015 | Alizadeh-Khiavi et al. |
| 9,067,168 B2 | 6/2015 | Frederick et al. |
| 9,095,809 B2 | 8/2015 | Deckman et al. |
| 9,108,145 B2 | 8/2015 | Kalbassi et al. |
| 9,120,049 B2 | 9/2015 | Sundaram et al. |
| 9,126,138 B2 | 9/2015 | Deckman et al. |
| 9,162,175 B2 | 10/2015 | Sundaram |
| 9,168,485 B2 | 10/2015 | Deckman et al. |
| 9,713,787 B2 * | 7/2017 | Owens .............. B01J 20/28023 |
| 2001/0047824 A1 | 12/2001 | Hill et al. |
| 2002/0053547 A1 | 5/2002 | Schlegel et al. |
| 2002/0124885 A1 | 9/2002 | Hill et al. |
| 2002/0162452 A1 | 11/2002 | Butwell et al. |
| 2003/0075485 A1 | 4/2003 | Ghijsen |
| 2003/0129101 A1 | 7/2003 | Zettel |
| 2003/0131728 A1 | 7/2003 | Kanazirev et al. |
| 2003/0170527 A1 | 9/2003 | Finn et al. |
| 2003/0202918 A1 | 10/2003 | Ashida et al. |
| 2003/0205130 A1 | 11/2003 | Neu et al. |
| 2003/0223856 A1 | 12/2003 | Yuri et al. |
| 2004/0099142 A1 | 5/2004 | Arquin et al. |
| 2004/0118277 A1 | 6/2004 | Kim et al. |
| 2004/0197596 A1 | 10/2004 | Connor et al. |
| 2004/0232622 A1 | 11/2004 | Gozdawa |
| 2005/0109419 A1 | 5/2005 | Ohmi et al. |
| 2005/0114032 A1 | 5/2005 | Wang |
| 2005/0129952 A1 | 6/2005 | Sawada et al. |
| 2005/0014511 A1 | 7/2005 | Keefer et al. |
| 2005/0145111 A1 | 7/2005 | Keefer et al. |
| 2005/0150378 A1 | 7/2005 | Dunne et al. |
| 2005/0229782 A1 | 10/2005 | Monereau et al. |
| 2005/0252378 A1 | 11/2005 | Celik et al. |
| 2006/0017940 A1 | 1/2006 | Takayama |
| 2006/0048648 A1 | 3/2006 | Gibbs et al. |
| 2006/0049102 A1 | 3/2006 | Miller et al. |
| 2006/0076270 A1 | 4/2006 | Poshusta et al. |
| 2006/0096911 A1 | 5/2006 | Brey et al. |
| 2006/0099096 A1 | 5/2006 | Shaffer et al. |
| 2006/0105158 A1 | 5/2006 | Fritz et al. |
| 2006/0162556 A1 | 7/2006 | Ackley et al. |
| 2006/0165574 A1 | 7/2006 | Sayari |
| 2006/0169139 A1 * | 8/2006 | Kishkovich ............ B01D 53/46 95/90 |
| 2006/0169142 A1 | 8/2006 | Rode et al. |
| 2006/0236862 A1 | 10/2006 | Golden et al. |
| 2007/0084241 A1 | 4/2007 | Kretchmer et al. |
| 2007/0084344 A1 | 4/2007 | Moriya et al. |
| 2007/0222160 A1 | 9/2007 | Roberts-Haritonov et al. |
| 2007/0253872 A1 | 11/2007 | Keefer et al. |
| 2007/0261550 A1 | 11/2007 | Ota |
| 2007/0261557 A1 | 11/2007 | Gadkaree et al. |
| 2007/0283807 A1 | 12/2007 | Whitley |
| 2008/0051279 A1 | 2/2008 | Klett et al. |
| 2008/0072822 A1 | 3/2008 | White |
| 2008/0128655 A1 | 6/2008 | Garg et al. |
| 2008/0282883 A1 | 11/2008 | Rarig et al. |
| 2008/0282884 A1 | 11/2008 | Kelley et al. |
| 2008/0282885 A1 | 11/2008 | Deckman et al. |
| 2008/0282886 A1 | 11/2008 | Reyes et al. |
| 2008/0282887 A1 | 11/2008 | Chance et al. |
| 2008/0282892 A1 | 11/2008 | Deckman et al. |
| 2008/0289497 A1 | 11/2008 | Barclay et al. |
| 2008/0307966 A1 | 12/2008 | Stinson |
| 2008/0314550 A1 | 12/2008 | Greco |
| 2009/0004073 A1 | 1/2009 | Gleize et al. |
| 2009/0014902 A1 | 1/2009 | Koivunen et al. |
| 2009/0025553 A1 | 1/2009 | Keefer et al. |
| 2009/0025555 A1 | 1/2009 | Lively et al. |
| 2009/0037550 A1 | 2/2009 | Mishra et al. |
| 2009/0071333 A1 | 3/2009 | LaBuda et al. |
| 2009/0079870 A1 | 3/2009 | Matsui |
| 2009/0107332 A1 | 4/2009 | Wagner |
| 2009/0151559 A1 | 6/2009 | Verma et al. |
| 2009/0162268 A1 | 6/2009 | Hufton et al. |
| 2009/0180423 A1 | 7/2009 | Kroener |
| 2009/0241771 A1 | 10/2009 | Manning et al. |
| 2009/0284013 A1 | 11/2009 | Anand et al. |
| 2009/0294366 A1 | 12/2009 | Wright et al. |
| 2009/0308248 A1 | 12/2009 | Siskin et al. |
| 2009/0314159 A1 | 12/2009 | Haggerty |
| 2010/0011803 A1 | 1/2010 | Warnecker et al. |
| 2010/0059701 A1 | 3/2010 | McLean |
| 2010/0077920 A1 | 4/2010 | Baksh et al. |
| 2010/0089241 A1 | 4/2010 | Stoner et al. |
| 2010/0186445 A1 | 7/2010 | Minta et al. |
| 2010/0212493 A1 | 8/2010 | Rasmussen et al. |
| 2010/0251887 A1 | 10/2010 | Jain |
| 2010/0252497 A1 | 10/2010 | Ellison et al. |
| 2010/0263534 A1 | 10/2010 | Chuang |
| 2010/0282593 A1 | 11/2010 | Speirs et al. |
| 2010/0288704 A1 | 11/2010 | Amsden et al. |
| 2011/0031103 A1 | 2/2011 | Deckman et al. |
| 2011/0067440 A1 | 3/2011 | Van Aken |
| 2011/0067770 A1 | 3/2011 | Pederson et al. |
| 2011/0146494 A1 | 6/2011 | Desai et al. |
| 2011/0217218 A1 | 9/2011 | Gupta et al. |
| 2011/0277620 A1 | 11/2011 | Havran et al. |
| 2011/0291051 A1 | 12/2011 | Hershkowitz et al. |
| 2011/0296871 A1 | 12/2011 | Van Soest-Vercammen et al. |
| 2011/0308524 A1 | 12/2011 | Brey et al. |
| 2012/0024152 A1 | 2/2012 | Yamawaki et al. |
| 2012/0031144 A1 | 2/2012 | Northrop et al. |
| 2012/0067216 A1 | 3/2012 | Corma Canos et al. |
| 2012/0152115 A1 | 6/2012 | Gerds et al. |
| 2012/0222551 A1 | 9/2012 | Deckman |
| 2012/0222552 A1 | 9/2012 | Ravikovitch et al. |
| 2012/0222553 A1 | 9/2012 | Kamakoti et al. |
| 2012/0222554 A1 | 9/2012 | Leta et al. |
| 2012/0222555 A1 | 9/2012 | Gupta et al. |
| 2012/0255377 A1 | 10/2012 | Kamakoti et al. |
| 2012/0308456 A1 | 12/2012 | Leta et al. |
| 2012/0312163 A1 | 12/2012 | Leta et al. |
| 2013/0061755 A1 | 3/2013 | Frederick et al. |
| 2013/0225898 A1 | 8/2013 | Sundaram et al. |
| 2013/0276634 A1 | 10/2013 | McKenna et al. |
| 2014/0013955 A1 | 1/2014 | Tammera et al. |
| 2014/0060326 A1 | 3/2014 | Sundaram |
| 2014/0157986 A1 | 6/2014 | Ravikovitch et al. |
| 2014/0208797 A1 | 7/2014 | Kelley et al. |
| 2014/0216254 A1 | 8/2014 | Tammera et al. |
| 2015/0013377 A1 | 1/2015 | Oelfke |
| 2015/0068397 A1 | 3/2015 | Boulet et al. |
| 2015/0196870 A1 | 7/2015 | Albright et al. |
| 2015/0328578 A1 | 11/2015 | Deckman et al. |
| 2016/0023155 A1 | 1/2016 | Ramkumar et al. |
| 2016/0129433 A1 | 5/2016 | Fowler et al. |
| 2016/0166972 A1 | 6/2016 | Owens et al. |
| 2016/0236135 A1 | 8/2016 | Tammera et al. |
| 2016/0332105 A1 | 11/2016 | Tammera et al. |
| 2016/0332106 A1 | 11/2016 | Tammera |
| 2017/0056813 A1 | 3/2017 | McMahon et al. |
| 2017/0056814 A1 | 3/2017 | Marshall et al. |
| 2017/0056815 A1 | 3/2017 | Smith et al. |

FOREIGN PATENT DOCUMENTS

| | | |
|---|---|---|
| EP | 0225736 | 6/1987 |
| EP | 0257493 | 2/1988 |

(56) References Cited

FOREIGN PATENT DOCUMENTS

| | | |
|---|---|---|
| EP | 0262934 | 4/1988 |
| EP | 0426937 | 5/1991 |
| EP | 0800863 | 2/1997 |
| EP | 1018359 | 7/2000 |
| EP | 1045728 | 11/2000 |
| EP | 1577561 | 9/2005 |
| EP | 1674555 | 6/2006 |
| EP | 2823872 | 1/2015 |
| FR | 2924951 | 6/2009 |
| JP | 58-114715 | 7/1983 |
| JP | 59-232174 | 12/1984 |
| JP | 60-189318 | 12/1985 |
| JP | 2002-253818 | 10/1990 |
| JP | 04-180978 | 6/1992 |
| JP | 2011-169640 | 6/1999 |
| JP | 2011-280921 | 10/1999 |
| JP | 2000-024445 | 8/2001 |
| JP | 2002-348651 | 12/2002 |
| JP | 2006-016470 | 1/2006 |
| JP | 2006-036849 | 2/2006 |
| JP | 2008-272534 | 11/2008 |
| WO | WO2002/024309 | 3/2002 |
| WO | WO2002/073728 | 9/2002 |
| WO | WO2005/090793 | 9/2005 |
| WO | WO2011/139894 | 11/2011 |

OTHER PUBLICATIONS

U.S. Appl. No. 15/284,973, filed Oct. 4, 2016, Fowler et al.
U.S. Appl. No. 15/284,982, filed Oct. 4, 2016, Fowler et al.
U.S. Appl. No. 15/351,693, filed Nov. 15, 2016, Ravikovitch et al.
U.S. Appl. No. 15/450,618, filed Mar. 6, 2017, Tammera et al.
Aroon, M.A. et al. (2010), "Performance studies of mixed matrix membranes for gas separation: A review," *Separation and Purification Technology*, 75(3), pp. 229-242.
ExxonMobil Research and Engineering and QuestAir (2008) "A New Commercialized Process for Lower Cost H2 Recovery—Rapid Cycle Pressure Swing Adsorption (RCPSA)," *Brochure*, 4 pgs.
Chunga, T. et al. (2007), "Mixed matrix membranes (MMMs) comprising organic polymers with dispersed inorganic fillers for gas separation," *Progress in Polymer Science*, 32(4), pp. 483-507.
Farooq, S. et al. (1990) "Continuous Countercurrent Flow Model for a Bulk PSA Separation Process," *AIChE J.*, v36 (2) p. 310-314.
FlowServe (2005)"Exceeding Expectations, US Navy Cuts Maintenance Costs With Flowserve GX-200 Non-Contacting Seal Retrofits," *Face-to-Face*, v17.1, 8 pgs.
GE Oil & Gas (2007) "Dry Gas Seal Retrofit," Florene, Italy, www.ge.com/oilandgas, 4 pgs.
Hopper, B. et al. (2008) "World's First 10,000 psi Sour Gas Injection Compressor," *Proceedings of the 37th Turbomachinery Symosium*, pp. 73-95.
Kikkinides, E. S. et al. (1995) "Natural Gas Desulfurization by Adsorption: Feasibility and Multiplicity of Cyclic Steady States," *Ind. Eng. Chem. Res.* V. 34, pp. 255-262.
Rameshni, Mahin "Strategies for Sour Gas Field Developments," *Worley Parsons-Brochure*, 20 pgs, date not provided.
Reyes, S. C. et al. (1997) "Frequency Modulation Methods for Diffusion and Adsorption Measurements in Porous Solids," *J. Phys. Chem. B.* v101, pp. 614-622.
Ruthven, D. M. et al. (1996) "Performance of a Parallel Passage Adsorbent Contactor," *Gas. Sep. Purif.*, vol. 10, No. 1, pp. 63-73.
Stahley, J. S. (2003) "Design, Operation, and Maintenance Considerations for Improved Dry Gas Seal Realiability in Centrifugal Compressors," *Dresser-Rand, Tech. Paper 134*, 15 pages.
Suzuki, M. (1985) "Continuous-Countercurrent-Flow Approximation for Dynamic Steady State Profile of Pressure Swing Adsorption" *AIChE Symp. Ser.* v81 (242) pp. 67-73.
Zimmerman, C.M. et al. (1997), "Tailoring mixed matrix composite membranes for gas separations," *J. of Membrane Science*, 137(1-2), pp. 145-154.
Zimmerman, C.M. et al. (1999), "Polypyrrolones for Membrane Gas Separations, II. Activation Energies and Heats of Sorption," *J. of Membrane Science, Part B—Polymer Physics*, 37(12), pp. 1251-1265.

\* cited by examiner

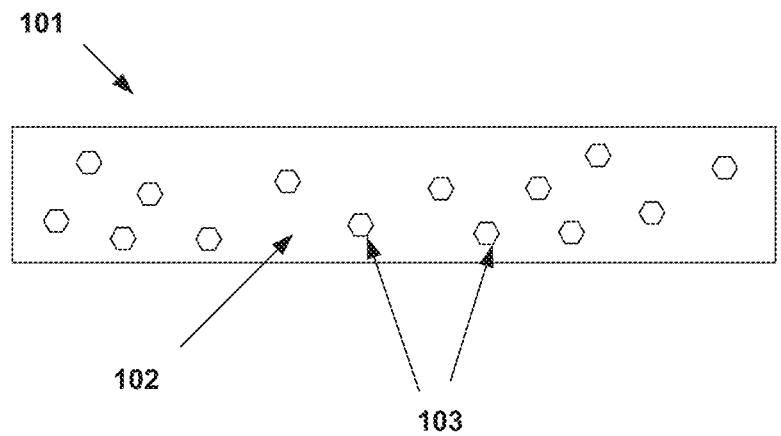
FIGURE 1
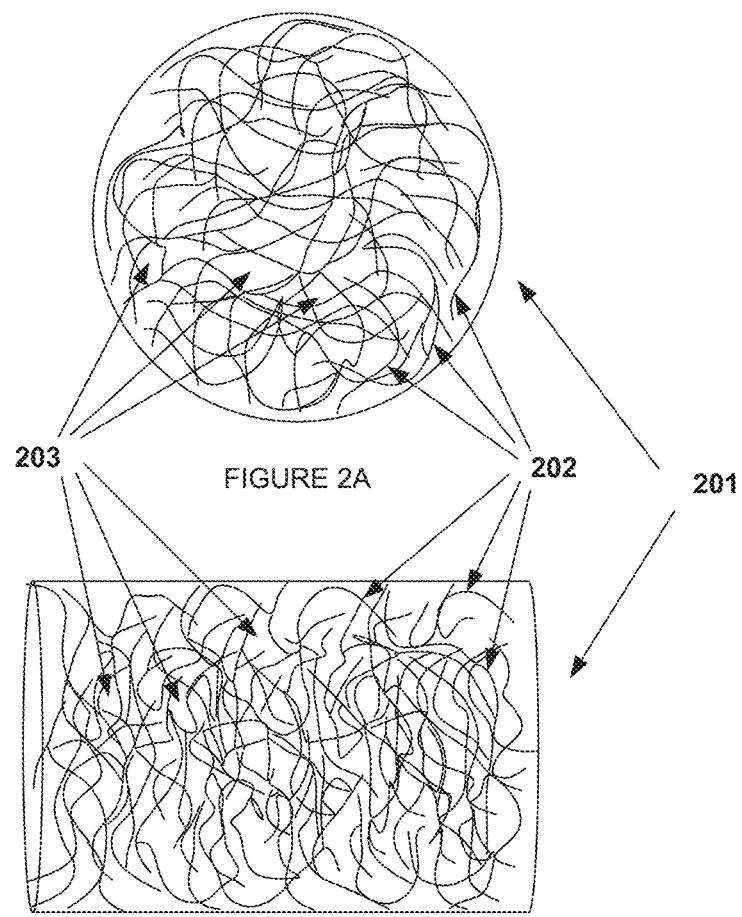
FIGURE 2A
FIGURE 2B

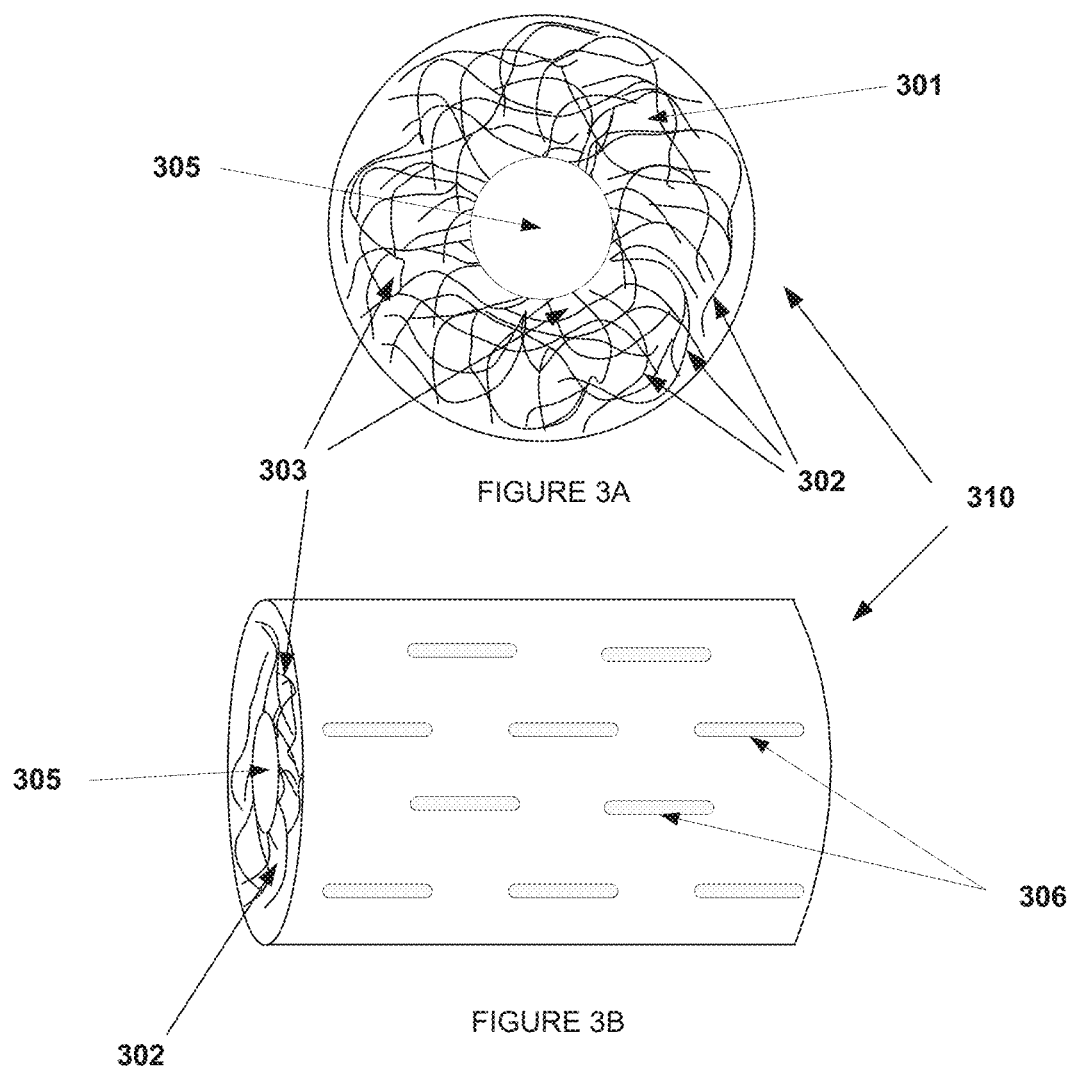

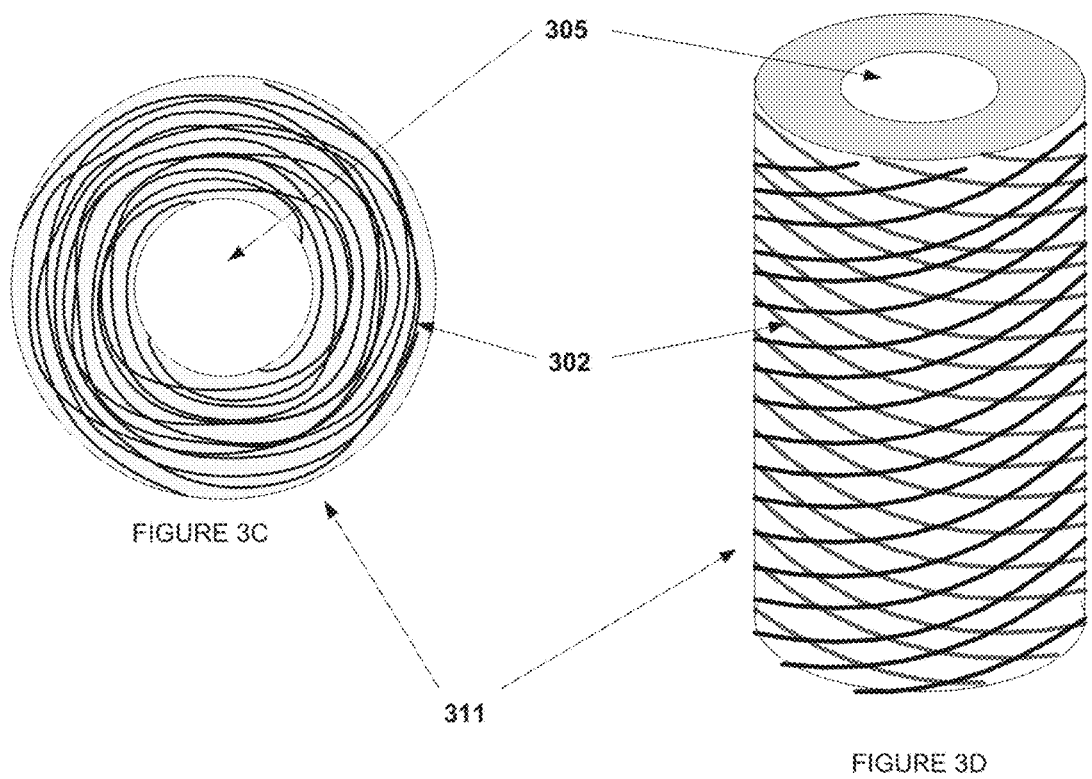
FIGURE 3C
FIGURE 3D
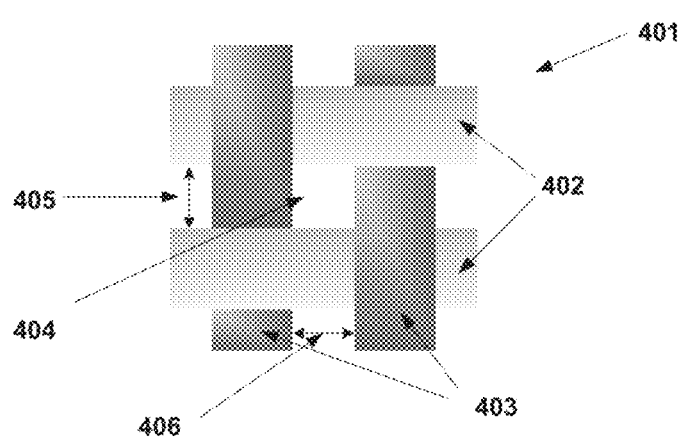
FIGURE 4

ADSORBENT-INCORPORATED POLYMER FIBERS IN PACKED BED AND FABRIC CONTACTORS, AND METHODS AND DEVICES USING SAME

CROSS-REFERENCE TO RELATED APPLICATION

This application is a continuation of U.S. application Ser. No. 14/941,798 filed Nov. 16, 2015, currently granted U.S. Pat. No. 9,713,787 B2, entitled ADSORBENT—INCORPORATED POLYMER FIBERS IN PACKED BED AND FABRIC CONTACTORS, AND METHODS AND DEVICES USING SAME, and claims priority to U.S. Provisional Application Ser. No. 62/089,902 filed Dec. 10, 2014, both of which are herein incorporated by reference in its entirety.

TECHNICAL FIELD

The various embodiments of the disclosure relate generally to gas adsorbent polymer fibers, the construction of pack beds and woven fabrics in gas contactors, and method of using gas adsorbent polymer fibers in the separation of gas streams.

BACKGROUND OF THE INVENTION

Individual components of a gaseous feed stream can be separated using Pressure Swing Adsorption (PSA) and Temperature Swing Adsorption (TSA) Processes. PSA and TSA processes are proven technologies for natural gas clean-up processes. These adsorption processes can increase gas recovery and reduce the cost and footprint of a natural gas recovery plant. The productivity of the PSA and TSA operation is dependent on the amount of gas that can be processed per hour and per pound of adsorbent. Dispersing the adsorbent onto a contacting structure with a large surface area can increase the productivity of the PSA and TSA separation.

For some PSA and TSA systems, it can be desirable to separate combinations of gases, including, for example, methane and carbon dioxide, using an adsorbent particle. To optimize the economic viability of these separations, the adsorbent particle can be dispersed onto a contacting structure that has a large surface area and properly sized gas channels throughout its length, typically at least sub-millimeter. Gas channels that are 100-300 microns can allow for unhindered diffusion of gas molecules from the bulk gas phase to the channels walls, where they can be adsorbed by the adsorbent particle. This will decrease the time needed for adsorption, allowing more gas to be processed each hour. Using a structure with a large surface area could allow for large amounts of adsorbent particle to be packed onto the structure per unit volume, reducing the size of the reactor required for separations and the footprint of the process. A contacting structure with a large surface area and sub-millimeter sized channels throughout its length can be beneficial.

BRIEF SUMMARY

The various embodiments of the disclosure relate generally to an adsorbent bed, rapid cycle adsorbent beds, adsorbent contactors, rapid cycle adsorbent beds, and methods of using same.

An embodiment of the disclosure can be an adsorbent bed having a plurality of fibers and tortuous channels between the fibers of the plurality of fiber. The plurality of fibers can be non-aligned. The fibers can include a polymer filament and adsorbent particles dispersed in the polymer filament. The polymer filament can be a porous polymer, and the porous polymer can have tortuous pathways within it, due to macropores, mesopores and/or micropores formed in the porous polymer. The adsorbent particles within the polymer can be in fluid communication with at least a portion of the tortuous channels of the adsorbent bed. The plurality of fibers can be randomly packed, spirally wound, or woven into a fabric.

In some embodiments, the adsorbent content of the filament can be at least 10 wt %, at least 15 wt % or at least 20 wt %. The filaments can have an average diameter of less than 1000 micrometers, less than 750 micrometers, less than 500 micrometers or less than 400 micrometers. In some embodiments, the adsorbent particles can have an average diameter that is less than about 50% the average diameter of the filament, or less than about 40%, or less than about 30%.

The adsorbent beds can be used in adsorption processes. In an embodiment, the adsorbent bed can be a temperature swing adsorption bed, a pressure swing adsorption bed, or a combination of both.

In some embodiments, the plurality of fibers can be woven or non-woven. In some embodiments, the plurality of fibers can be randomly packed, spirally wound, or woven into a fabric. The plurality of fibers can be a non-woven bed of randomly packed filaments, or can be a bed of spirally wound filaments. The bed can have tortuous channels between the filaments. The plurality of fibers can also form a woven fabric of the filaments, where the fabric has a warp and a weft. Tortuous channels can form in the spacing between the woven filaments. Gas feed may flow either through or over the plane of the fabric. The fabric can be package to form a contacting structure. The contacting structure can be a serpentine structure or a spiral structure. The contacting structure can have spacers of between about 50 and 500 micrometers.

An embodiment of the disclosure can include an adsorbent contactor. The adsorbent contactor can include the adsorbent bed described above, and can have the characteristics of the absorbent bed. The adsorbent contractor can include a chamber having a gas feed stream inlet and a gas feed stream outlet, a plurality of fibers, and tortuous channels between fibers of the plurality of fibers. The fibers can have a polymer filament and adsorbent particles dispersed within the filament, and the adsorbent particles can be in fluid communication with at least a portion of the tortuous channels between the fibers. The adsorbent particles can be in fluid communication in a porous polymer having tortuous pathways within the porous polymer.

In some embodiments, the contactor can be a temperature swing adsorption contactor or a pressure swing adsorption contactor. The contactor can include hollow tubes passing through the chamber, where the tubes have a heat transfer fluid inlet and a heat transfer fluid outlet, and a heat transfer medium in the tubes. Solid tubes that can be electrically or otherwise heated can also be utilized.

An embodiment of the disclosure can be a method of adsorbing a component of a medium. The method can include the absorbent bed described above, or the absorbent contactor described above, including the characteristics or each as described. The method can include contacting a medium with a plurality of fibers and tortuous channels between the fibers, and selectively adsorbing a component of the medium with the plurality of fibers. Each of the fibers can include a polymer filament and adsorbent particles dispersed within the filament, and the adsorbent particles can be in fluid communication with at least a portion of the tortuous channels of the adsorbent bed. The method can further include desorbing the component of the medium from the plurality of fibers. The method can also include repeating the contacting and adsorbing steps. The medium can be a flue gas, natural gas, fuel gas, bio gas, town gas, waste gas, water, coal gas, air, or a carbon dioxide containing medium. The component can be $CO_2$, $SO_x$, $NO_x$, $H_2S$, or water.

BRIEF DESCRIPTION OF THE DRAWINGS

FIG. 1 illustrates a polymer filament having adsorbent particles, in accordance with an exemplary embodiment of the disclosure.

FIGS. 2A-2D illustrate an adsorbent bed, in accordance with an exemplary embodiment of the disclosure.

FIGS. 3A-3D illustrate adsorbent beds of randomly oriented or spirally wound filaments, and contactors in a radial arrangement, in accordance with an exemplary embodiment of the disclosure.

FIG. 4 illustrates filaments woven into a fabric, in accordance with an exemplary embodiment of the disclosure.

DETAILED DESCRIPTION

Figures 2C, 2D:
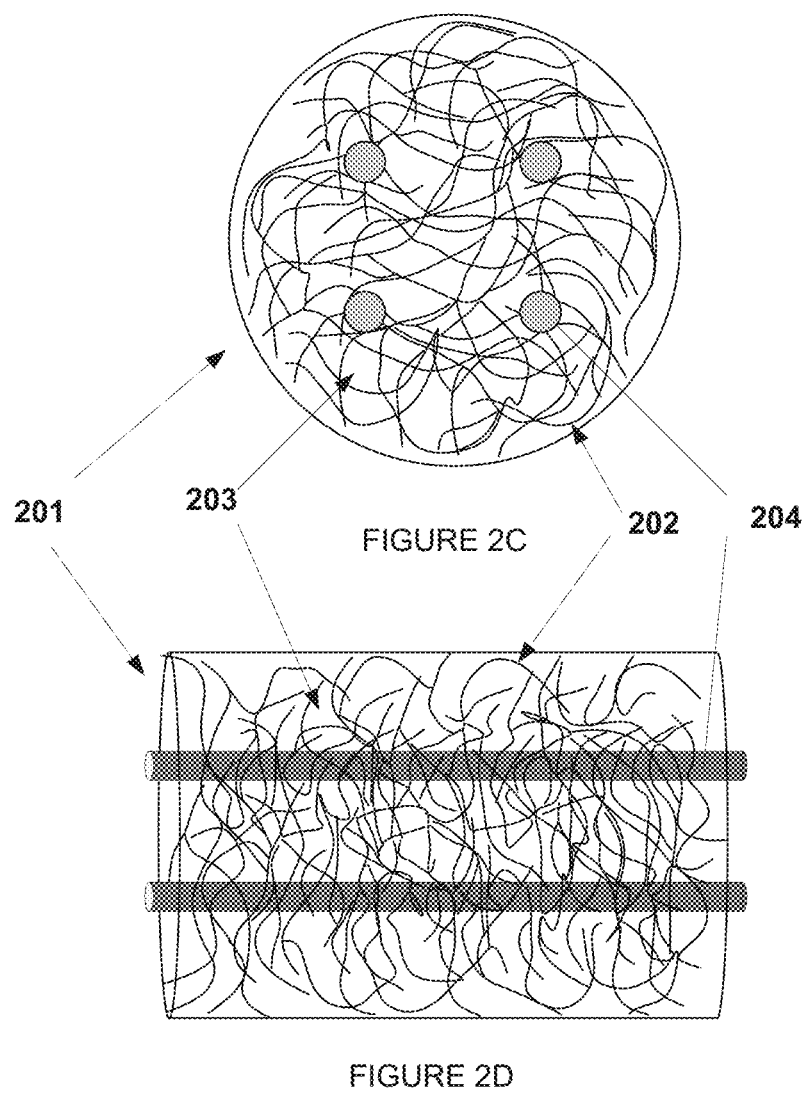

Although preferred embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. The disclosure is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" one particular value and/or to "about" or "approximately" another particular value. When such a range is expressed, another embodiment includes from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Adsorbents beds, processes, and systems are disclosed herein. The absorbent bed can preferably be a rapid cycle adsorbent bed. By "rapid cycle" is generally meant an adsorption process that achieves fast adsorption and desorption sequences. A rapid cycle can be about 10 minutes or less to complete one cycle, i.e. one complete adsorption and desorption cycle. In some embodiments, rapid cycle can be about 8 minutes or less, about 5 minutes or less, about 4 minutes or less, about 3 minutes or less, about 2 minutes or less, or about 1 minute or less.

The adsorbent bed can also preferably be a rapid cycle adsorbent bed with kinetic separation. Kinetic separations are adsorption processes in which one species can be preferentially adsorbed over another competing species due to a difference in the speed with which they enter the adsorbent. Without wishing to be bound by theory, this selectivity can be driven by several factors, including the relative molecular sizes of the competing species, the rate of diffusion into and out of an adsorbent and its supporting structure, and pore size of the adsorbent. The fast species should be able to get to the adsorbent particle quickly by having a short distance to diffuse into the adsorbent containing mixture to get to the adsorbent particle. Traditionally, this is accomplished by having very small composite adsorbent particles, which have very high pressure drops in a packed bed, or by coating thin layers of adsorbent on the walls of a monolith, which leads to low capacities. These issues of capacity and pressure drop are significant hurdles to overcome. The materials of this disclosure can achieve rapid adsorption with kinetic separations, with the possibility of better capacities and/or lower pressure drops. The adsorption/desorption cycle in kinetic separation can be less than about 1 minutes, or less than about 45 seconds, or less than about 30 seconds.

An adsorbent bed is disclosed that contains a plurality of fibers. The fibers can be a polymer filament and adsorbent particles dispersed within the polymer filament. The adsorbent particles can be in fluid communication with the exterior of the polymer filament. The plurality of fibers can be woven into a mat or weave, can be randomly packed, or can be spirally wound as part of the adsorbent bed. The plurality of fibers can be non-aligned, meaning non-parallel in a straight-line bundle. The plurality of fibers can have circuitous, or tortuous, channels between the fibers through which a gas can pass, and via which the adsorbent particles can interact due to being in fluid communication with the exterior of the polymer filament.

The disclosure includes the plurality of fibers. The plurality of fibers can include a fiber that can be composed of a polymer filament and adsorbent particles dispersed within the polymer. For example, in FIG. 1, a portion of the polymer filament 101 is shown, including the polymer 102 and the adsorbent particles 103. The adsorbent particle 103 can be in fluid communication with the exterior of the polymer filament 101.

The polymer can be any material suitable for use in a pressure or temperature swing adsorbent bed. Some exemplary polymers can include polyimides, polysulfones, polydimehtylsiloxanes, polyetherimides, polyether ketones (PEEK) or any other polymer with the ability to form porosity, either inherently during the spinning or drawing of the fiber or through use of pore forming chemicals designed to create a porous polymer. By porous polymer is meant a polymer having some amount of porosity within the polymer, and would have a lower density that the same type of polymer that does not have porosity. The porous polymer can also be described as being a macroporous or mesoporous polymer, or a polymer having pores, macropores, mesopores, and/or micropores. The porous polymer can be described as having a void fraction of at least about 5% volume, at least about 10% volume, at least about 15% volume, at least about 20% volume, or at least about 25% volume, (as compared to the same polymer that is non-porous.) The void fraction of the polymer can be up to about 90% volume, up to about 85% volume, or up to about 80% volume. In some embodiments, the void fraction of the porous polymer can be between about 15% to 85% volume, between about 20% to 80% volume, or about 25% to about 75% volume. A porous polymer can be produced by any method used to produce porosity in a polymer material. In a non-limiting example, the polymer filament could be produced using a porogen that creates pores within the polymer, where the porogen can be, for example, a gaseous porogen, a diffusible porogen, or an extractable porogen. Porosity can also be introduced during spinning by phase inversion, wherein a solvent is removed causing the precipitated polymer to be formed with porosity. The porosity can be structured or random.

The adsorbent particles in this disclosure can be a material suitable for adsorption of a gas in a gas separation or removal process. The adsorbent can be a material effective in a pressure swing adsorption process or a temperature swing adsorption process.

Medium separation is important in various industries, including but not limited to, the production of fuels, chemicals, petrochemicals, purified gases, and specialty products. The term "medium" is used herein for convenience and refers generally to many fluids, liquids, gases, solutions, suspensions, powders, gels, dispersions, emulsions, vapors, flowable materials, multiphase materials, or combinations thereof. A medium can comprise a feed stream. A medium can comprise a mixture of a plurality of components. The term "plurality" as used herein refers to more than one. Preferably the medium herein is a gas, and the adsorbents are being applied in gas separation technologies.

Medium separation can be accomplished by many methods that, assisted by heat, pressure, solids, fluids, or other means, generally exploit the differences in physical and/or chemical properties of the components to be separated. Gas separation can be achieved by partial liquefaction or by utilizing an adsorbent material that preferentially retains or adsorbs a more readily retained or adsorbed component relative to a less readily adsorbed component of the gas mixture.

Pressure swing adsorption (PSA) and temperature swing adsorption (TSA) are two commercially practiced gas separation process. TSA comprises a process wherein a bed of adsorbent material is used to separate one or more components out of a stream of a medium, and then the adsorbent bed can be regenerated, thereby releasing the adsorbed components, by increasing the temperature of the bed. PSA similarly includes a bed of material used to separate one or more major components from a medium, but the absorbent bed can be regenerated by changing the pressure of the system.

Both TSA and PSA processes can comprise preferential adsorption of at least one component of a medium by an adsorbent material relative to a second component or other components in the medium. The total amount of the at least one component adsorbed from the medium (i.e., the adsorption capacity of the adsorbent material) and the selectivity of the adsorption for one component over another component of the medium, can often be improved by operating the adsorption process under specific pressure and temperature conditions, as both pressure and temperature may influence the adsorption loading of a component of the medium. The adsorbed component can be later desorbed from the adsorbent material.

Adsorption and desorption of a component in TSA occurs because adsorption isotherms are strongly influenced by temperature. Thus, high purities of a component of a medium can be obtained by adsorbing at low temperature, where adsorption is strong, with the release of a strongly held component being possible by means of high temperature for desorption. In TSA processes, heat for desorption may be supplied directly to the adsorbent material by flowing a hot desorbent medium through the bed, or indirectly to the adsorbent material through a heating coil, electrical heat source, heat transfer medium, or heat exchanger, among others, which are in intimate association with the adsorbent material.

Adsorption and desorption of a component in PSA occurs because adsorption of gases in a medium increases with an increasing pressure. Different gases tend to have different adsorption coefficients with different substrates, so a mixture of gases can be passed through a bed at higher pressure to selectively adsorb at least one of the gases in the mixture. Once the bed reaches the end of its capacity, the pressure can be reduce to collect the adsorbed gas and regenerate the adsorbent.

The PSA and TSA processes do not have to be exclusively only pressure or temperature. The pressure in a TSA process can also be changed during adsorption/desorptions, and the temperature in a PSA process can also be changed during adsorption/desorptions. Moreover, purge gases or other means might also be used in conjunction with PSA and/or TSA processes.

In each of the TSA and PSA processes, the nature of the adsorbent and the nature of the structure containing the adsorbent can impact both the type of adsorption, effectiveness and efficiency of adsorption, and capacity for a gas in the process.

The adsorbent in this disclosure can be a material suitable for adsorption of a gas in a gas separation or removal process. The adsorbent can be a material effective in a pressure swing adsorption process or a temperature swing adsorption process. In some embodiments, the adsorbent can be a material that adsorbs $CO_2$ from a gas stream. In an embodiment, the adsorbent can be a zeolite, metal oxide, metal organic framework, zeolitic imidozolate framework, or activated carbons. Preferably, the adsorbent can be a zeolite. The zeolite can be any zeolite used in an adsorption process, including but not limited to zeolite A, zeolite X, zeolite Y, MFI, DDR, ZSM-58, mordenite, silicalite, chabasite, faujasite, and variations of these frameworks.

The adsorbent content of the polymer filaments can be any amount up to a content at which the polymer loses its flexibility and/or its structural integrity. The ability to increase or decrease the adsorbent content of the polymer allows for control of the capacity of the polymer and the device, depending on its application. The absorbent content of a filament can be at least about 5% by weight in the filament, i.e. 5% weight absorbent per weight filament. This can also be described as the weight fraction of the absorbent in the filament. The absorbent content can be at least about 10% by weight, at least about 15% by weight, at least about 20% by weight, at least about 25% by weight, at least about 30% by weight, at least about 33% by weight, at least about 40% by weight, at least about 45% by weight, at least about 50% by weight. The adsorbent content can be up to about 90% by weight or up to about 85% by weight.

The adsorbent particles can be at least partially contained within the polymer filament, i.e. within the diameter or the polymer. The polymer can have adsorbent particles throughout the polymer, and the adsorbent does not need to be at the surface of the composite, unlike other systems, such as monoliths or coated fabrics, where the adsorbent is coated only on the exterior surfaces. Some amount of adsorbent can be within the polymer filament, meaning the amount of adsorbent is not directly exposed at the surface of a composite. In an embodiment, at least about 5% of the adsorbent can be contained within the polymer filament. The amount of adsorbent within the polymer filament can be at least about 10%, at least about 15%, or at least about 20%. The amount of adsorbent within the polymer filament can be up to about 100% of the adsorbent.

However, despite being within the polymer filament, the adsorbent can be in fluid communication with the surface of the polymer, and thus with the space outside the polymer and between adjacent polymeric fibers, by virtue of the porosity of the polymer. The macroporosity and mesoporosity of the polymer fiber provides for tortuous pathways within the polymer. As a result, the adsorbent can be in fluid communication with the tortuous channel of the bed. As discussed further below, the tortuous channels, also called circuitous channels, are the routes or spaces that occur between fibers in the bed. In contrast, tortuous pathways are the portion of the polymer composed of the macropores, mesopores and micropores in the porous fiber. Note also that the polymer can have a permeability for the medium passing through the tortuous channels that can also allow for some communication of adsorbent with the tortuous channels. As a non-limiting example, some polymers can show solubility/permeability with $CO_2$, so some $CO_2$ could also pass through the polymer via standard diffusion rather than through the tortuous pathways. Preferably, in an embodiment, the adsorbent particles within the polymer filament can be in fluid communication with at least a portion of the tortuous channels of the adsorbent bed.

The polymer filament used to construct the adsorbent beds can be any filament size that can accommodate the adsorbent particle and maintain some level of flexibility. In some embodiments, the polymer filament can have a diameter of between 10 to 1000 micrometers. The diameter of the polymer filament can be described as the average diameter of the filament, i.e. the cross-sectional diameter of a filament, as that term is used by one of ordinary skill in the art. The average filament diameter can be less than about 500 micrometers. The average filament diameter can be less about 400 micrometers, less than about 300 micrometers, less than about 250 micrometers, less than about 200 micrometers or less than about 100 micrometers. The average filament diameter can be greater than about 10 micrometers, greater than about 20 micrometers, greater than about 30 micrometers, or greater than about 40 micrometers.

In some embodiments, more than one polymer filament size can be used. For example, in some embodiments, the plurality of fibers can be woven into a fabric, and the fabric can have a warp and a weft, describing the two sets of perpendicular fibers. In some embodiments, filaments in the fibers of the warp can have a diameter that is the same as the diameter of filaments of fiber in the weft. Alternatively, filaments in the fibers of the warp can have a diameter that is different from the diameter of filaments of fiber in the weft. When filaments having different diameters are used, the difference between the largest average filament diameter and the smallest average filament diameter can be up to about 10 to 1, up to about 7.5 to 1, up to about 5:1, up to about 3:1.

The adsorbent particles can have an average diameter associated with the particles. That average diameter can be measured and described using standard techniques. The average particle diameter can also be defined as the volume weighted average of the distribution of a set of particles having various particle diameters. The adsorbent particles can generally be smaller in diameter than the filament it is incorporated into. The average size of the adsorbent particle is generally less than about 40% of the average filament diameter, or less than about 30% the average filament diameter. In some embodiments, the average size of the adsorbent particle can be less than 25% of the average filament diameter, less than about 20% of the average filament diameter, or less than about 15% of the average filament diameter. In some embodiments, the adsorbent particles can have an average diameter of between about 1 to 100 µm, or between about 5 to 50 µm, or preferably an average particle diameter of between about 10 and about 40 µm. Smaller sizes can also be utilized in this technology. Therefore, in some embodiments, the adsorbent particles can have an average diameter of as small as 0.01 µm, or as low as 0.1 µm. The range of the average diameter can be between about 0.01 to 100 µm, or between about 0.1 to 100 µm. The average particle diameter can be between about 1 and about 10 µm, between about 1 and about 50 µm, between about 5 µm and about 50 µm, between about 5 µm and about 40 µm, or about 10 µm and about 40 µm.

The adsorbent particles can be incorporated into the filament by any method used to introduce a solid into a polymer material. In an embodiment, the adsorbent can be dispersed in a polymer mixture prior to drawing or spinning the polymer mixture. The polymer mixture can be a molten polymer or a polymer solvent solution, such as in a thermoplastic polymer, or in a thermosetting polymer solution prior to drawing or spinning. The adsorbent can also be suspended in polymer component, such as a component of a thermosetting polymer. The adsorbent/polymer mixture can be a continuous porous polymer phase which can then be extruded into solid filaments. Extruding can include any technique used to form polymer filaments, such as spinning or drawing processes, including for example a phase inversion drawing process. The solid filaments can be described as a filament, a monofilament, or a polymer filament. Preferably, the polymer filaments are non-hollow polymer filaments, meaning that the polymer is not specifically prepared to include a lumen within the polymer filament.

In the disclosure, an adsorbent bed can comprise a plurality of fibers and tortuous channels between fibers of the plurality of fibers. In an embodiment, the plurality of fibers can form a bed of woven or non-woven filaments. In one embodiment, the plurality of fibers can be a non-woven bed of randomly packed filaments, and the tortuous channels can form between the filaments. One exemplary embodiment of a nonwoven bed is shown in FIG. 2A (Top View) and FIG. 2B (Side View). A bed 201 of randomly packed filaments 202 is shown. The randomly packed filaments 202 have between them tortuous channels 203. Gas can flow into the tortuous channels between the randomly packed fibers. In another embodiment, the plurality of fibers can be spirally wound to form a bed, or can be woven to form a fabric.

By dispersing adsorbent in a continuous porous polymer phase, extruding the mixture into solid filaments, and then arranging these monofilaments into a bed, an adsorbent bed can be provided that has a self-supporting large surface area contacting structure. Such a structure can be easy to manufacture. The polymer/adsorbent solid monofilaments can produce a bed having sub-millimeter sized tortuous channels in the structure. Additionally, the beds can be designed for PSA or TSA systems. For example, the system in FIGS. 2A and 2B might be utilized in a pressure swing adsorption process, where the change in pressure can be accomplished in the bed. Additional structures or supports could also be included in the bed design. For example, supporting structures could be added to maintain the location or distribution of the filaments. Alternatively, a contactor bed could be constructed using hollow tubes in the structure, such as is shown in FIG. 2C (Top view) and 2D (Side view.) The bed 201 containing the polymer/adsorbent filament 202 and having tortuous channels 203 could also include tubes 204 through which a heat transfer medium such as water could pass. A liquid can flow through the tubes providing a temperature change for temperature swing adsorption processes, or the tubes could be used to maintain a specific temperature for, or adjust the temperature during, a pressure swing process. The gas can flow into tortuous channels between the randomly packed fibers, and a heat transfer medium can flow through hollow tubes inserted throughout the bed. Note also that the tubes do not need to run parallel with the bed, but could run perpendicular to the bed. Instead of tubers, the bed can include thermally conductive metal or wires or other fibers to control the temperature and heating of the bed. Other methods of heating or maintaining the temperature could also be used, such as heating with a flow of gas.

Beds of this disclosure can include a conventional bed design, such as is shown in FIGS. 2A-D, where gas can flow down the length of the bed, i.e. parallel to the length of the bed. Beds of this disclosure can also include other bed designs, such as, for example, a radial bed. One example of a radial contactor is shown in FIG. 3A (Top View) and 3B (Side View.) The contactor 310 contains the bed 301 of polymer/adsorbent filament 302 and having tortuous channels 303. A gas flow passage 305 can allow for flow of the medium into the bed, and the gas can exit via the contactor's outlets 306 after passing through the filaments 302 via the tortuous channels 303. The polymer filaments in such a radial bed can be randomly packed as shown in FIG. 3A. The polymer filaments can also be spirally wrapped, as shown in FIG. 3C (Top View) and 3D (Side View.) In a spirally wrapped bed 311, the polymer filaments 302 can be wrapped around a mandrel or structure to form the spirally aligned fibers. The mandrel or structure could be removed, leaving a passage 305 for the medium to be fed into the bed, and then passing radially through the bed 311. Alternatively, the mandrel or structure could remain, and gas could pass in a direction parallel to the through the length of the bed rather than perpendicularly through the bed. Moreover, in addition to randomly oriented or spirally wrapped fibers, the polymer filaments of the radial bed can also be woven into a fabric, as discussed in more detail below, and the fabric placed within the bed such the gas flow can pass through the fabric from the internal inlet to the external outlets. Note also that while radial contactors such as are shown FIGS. 3A and 3B are described as having a gas that flows into the interior and out the exterior, the contactor could be designed to operate in the opposite direction, with gas flowing in through the exterior, passing through the plurality of fibers, and being collected at passage 305.

In an embodiment, the filaments can be woven into a fabric. The plurality of fibers can form a woven fabric of filaments. The fabric would have a warp and a weft. Tortuous channels can be formed in the spacing between the fibers of the woven fabric. For example, monofilaments can be woven into a fabric, resulting in a self-supporting large surface area contacting structure, as shown in FIG. 4. A filament 402 can be woven with a second filament 403 to form the fabric 401. The fabric 401 can have tortuous channels 404 between the filaments, and the size of those tortuous channels can be controlled by the spacing of the fibers in the weave, such as the warp and weft spacings at 405 and 406.

By nature of the weaving of the filaments, the fabric can have a warp and a weft, and the fabric can have a warp fiber and a weft fiber. The warp fiber and the weft fiber can have the same characteristics, for example, the same diameter and same adsorbent content. Alternatively, the warp fiber could have one diameter and adsorbent content, and the weft fiber could have a different diameter or content. The warp fibers generally run parallel to one another, and can have a spacing between the warp fibers, defined herein as the warp spacing. The weft fibers can generally run parallel to one another, and can have a spacing between weft fibers defined herein as the weft spacing. The warp spacing and the weft spacing can be the same, or can be different. In some embodiments, some of the fibers running in one direction can be replaced with alternate structures. For example, a portion of the warp fibers could be replaced with wire, which might aid in heat transfer or heat capacity, or provide structural support to the fabric. Alternatively a portion of the fibers could be replaced with hollow tubes, and a heat transfer medium could flow through the tubes.

Once the woven fabric is constructed, the fabric can be packed to form a contacting structure, or contactor. For example, the fabric can be rolled to form a spiral structure. Alternatively, the fabric can be folded to form a serpentine structure. In some cases, the packaged structure can be self-supporting by virtue of the fabric's construction. In some cases, spacers can be included between sections of the packaged fabric. The spacers can control the space between portions of the packaged fabric. The spacers can be about 50 micrometers to about 1000 micrometer, about 50 micrometers to about 500 micrometer, about 100 micrometers to about 400 micrometer, or between about 200 micrometers to about 300 micrometer. The spacers can be greater than 75 micrometers, greater than 100 micrometers, or greater than 150 micrometers. The spacers can be less than about 500 micrometer, less than about 450 micrometers, less than about 400 micrometers, less than about 350 micrometer, or less than about 300 micrometers. The spacers can be solid tubes or individual supports. The spacers can also be hollow tubes, and the tubes can have a heat transfer medium that can flow through them.

Figure 5A:
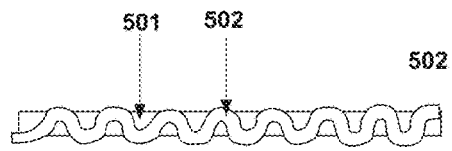
FIGS. 5A-5F illustrate an adsorbent bed contactor with a woven fabric, in accordance with an exemplary embodiment of the disclosure.
Figure 5B:
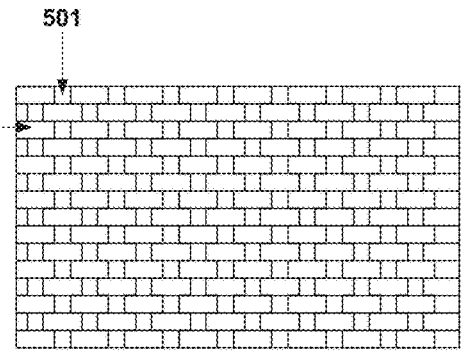
Figure 5C:
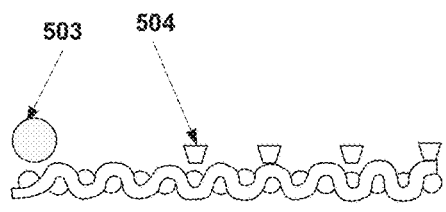
Figure 5D:
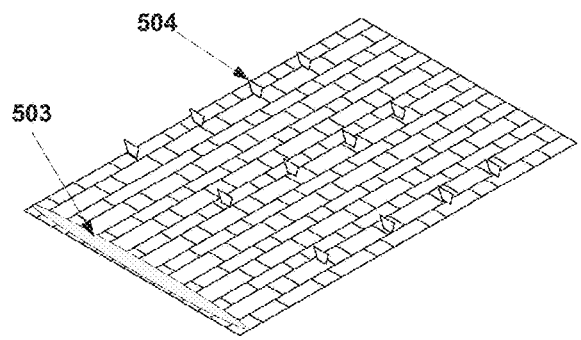
Figure 5E:
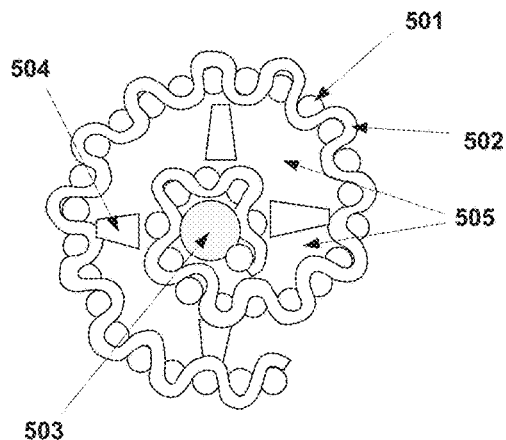
Figure 5F:
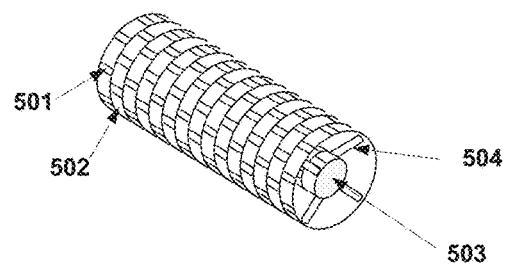
Figure 6A:
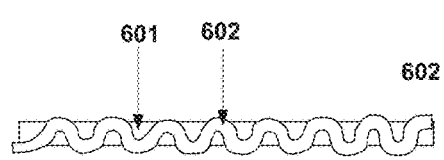
FIGS. 6A-6F illustrate an adsorbent bed contactor with a woven fabric, in accordance with an exemplary embodiment of the disclosure.
Figure 6B:
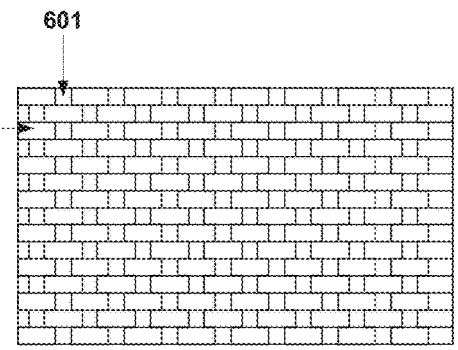
Figure 6C:
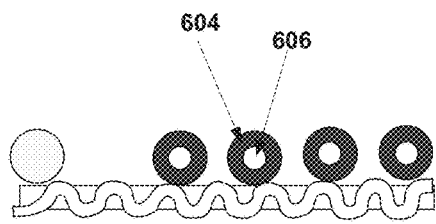
Figure 6D:
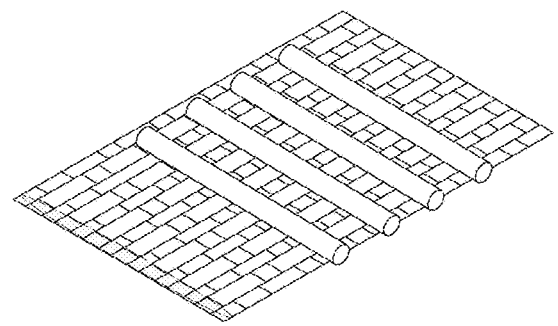

FIGS. 5A-F present a non-limiting example of a contractor containing a woven fabric that is wound into a spiral. In FIG. 5A, a fabric woven of monofilaments, with weft fibers 501 and warp fibers 502, is shown in a cross-sectional view. FIG. 5B shows a top view of a woven fabric. FIGS. 5C and 5D demonstrate the inclusion of a mandrel, rod, or other support 503 at one end of the fabric and spacers 504 distributed across the fabric. The fabric can then be rolled as shown in cross-sectional view of FIG. 5E to give a spiral wound structure having the warp and weft fibers 501 and 502, mandrel 503, and spacers 504. In the spiral wound structure can then be seen the gas channels 505, through which gas would flow and interact with the plurality of fibers in the woven fabric. FIG. 5F shows a top view of the rolled spiral structure. FIGS. 6A-F presents another non-limiting example of a contactor containing the plurality of fibers woven into the fabric, including warp and weft fibers 601 and 602. In FIG. 6C hollow tubes 604, having an interior center 606 can be used instead of spacers. The structure can be rolled to form the spiral structure shown in FIG. 6E, having gas channels 605. The hollow tubes 604 can be used as structural supports, or can also be used to control the temperature of the contactor by passing a heat transfer medium through the tubes. Controlling the temperature of the bed can be an important aspect of a TSA process, where the change in temperature changes the adsorption profile, but can also be used to control or maintain the temperature of a bed in a PSA process.

Figure 6E:
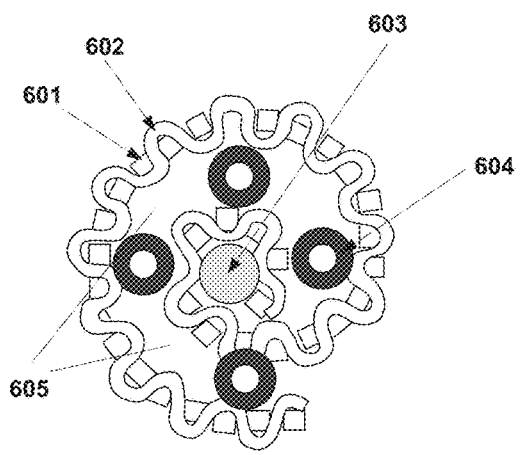

The spiral structures, as shown in FIGS. 5E and 6E, can be similar to a coated spiral wound structure used in traditional monolith or contactor designs, where a metal mesh or sheet is spiral wound and coated with an adsorbent. However, unlike the metal contactors, a coating procedure is not necessary. An adsorbent is already in the fabric's filaments, therefore the difficulties inherent in coating procedures can be avoided.

Another benefit unique to this contactor design can be the size of the gas channels within the structure and the structure's adsorbent loading, factors which are both important to the productivity of PSA/TSA. The gas channels between layers of the fabric can be controlled through choice of the appropriate fabric design parameters. For example, the size of the gas channels in the fabric adsorbent structure can be controlled by how tightly the fabric is rolled into a cylinder after weaving; a more tightly rolled fabric will have smaller gas channels. The gas channels can be controlled by the spacer placed between layers, or can be a function of the fabric itself, because a self-supporting fabric can maintain a certain distance between layers. In an embodiment, the gas channels can be about 30 to 500 micrometers. The gas channels can be about 50 micrometers to about 500 micrometer, about 100 micrometers to about 400 micrometer, about 100 to about 300 micrometers, or between about 200 micrometers to about 300 micrometer. The gas channels can be greater than 75 micrometers, greater than 100 micrometers, or greater than 150 micrometers. The gas channels can be less than about 500 micrometer, less than about 450 micrometers, less than about 400 micrometers, less than about 350 micrometer, or less than about 300 micrometers.

The weaving pattern of the fabric, which is defined as the crossing method of warp (yarns in the vertical axis of the fabric) and weft yarns (yarns in the horizontal axis of the fabric) can be used to control the fabrics solids density, where fabric solids density is the fraction of the volume of the filament over the total volume of the fabric. For example, a plain weave using one type of fiber can have a fabric solids fraction up to 78%, while a satin weave can have a fabric solids fraction up to 50%. Additionally, varying the shape of the woven filaments can increase the fabric solids fraction.

If a plain weave fabric is woven with square shaped filaments, instead of cylindrical filaments, the fabric's solids fraction can be increased from up to 78% to up to 100%. Using two different fibers in the warp and the weft can also access different fabrics solids density. Thus, in an embodiment, the fabrics solids density of a fabric can be up to about 50%, up to about 60%, up to about 70%, up to about 75%, up to about 80%, up to about 90%, or up to about 100%. The fabrics solids density can be greater than about 10%, greater than about 25%, greater than about 30%, or greater than about 40%.

Figure 7:
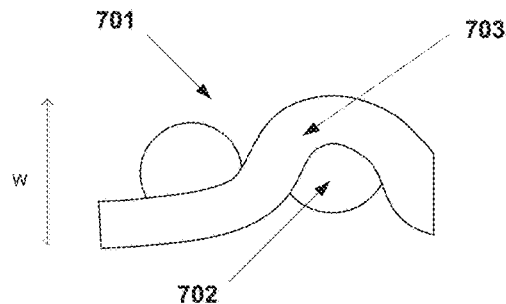
FIG. 7 illustrates a cross-sectional view of warp and weft fibers in a fabric, in accordance with an exemplary embodiment of the disclosure.

The disclosure also includes the ability to control other variables of the fabric. For example, the filament diameter can be used to define the thickness of the adsorption layer in the rolled structure. The larger the filament diameter the thicker the adsorption layer, as exemplified in FIG. 7, where a warp fiber 702 and a weft fiber 703 form a fabric 703, and the fabric has a cross-sectional width W shown in FIG. 7. The cross-sectional width can generally be between 1 to 5 times the width of the fiber, depending in part on how tightly the filaments are pulled. In the case where both fibers have approximately the same diameter, the cross-sectional width can be about 3 times the diameter of the fibers. In other embodiments, the cross-sectional width can be about 2.5 to about 3.5 times the average diameter of the fibers. The cross-sectional width can be about 1.5 times the diameter of the fibers, or about 2 times the average diameter of the fibers. Also, the zeolite loading in each filament can be controlled by varying the amount of adsorbent particles mixed into the polymer solution before extrusion of the filaments.

Several benefits can be achieved with the current disclosure. The structure can perform similar to more traditional coated monolithic structures, but coating procedures would not be necessary. There will be no need to coat the structure with adsorbents as the adsorbent will already be in the fabric's filaments. Therefore the difficulties inherent in coating procedures, such as clogging, can be avoided. Another benefit unique to this contactor design is that the size of the tortuous channels within the fabric and the structure's absorbent loading, factors which are both important to the productivity of PSA and TSA, can easily be controlled through choice of the appropriate bed design parameters. For example, the size of the tortuous channels in the fabric adsorbent structure can be controlled by the diameter of the filaments and the packing density of the filaments; a more dense packing with smaller fibers can have smaller tortuous channels. The ability of the adsorbents and fibers to rapidly absorb and desorb can be adjusted, as can the pressure drop across a bed of fibers, for example by controlling the polymer filament diameters and packing densities. Additionally, varying the amount of adsorbent particles mixed into the polymer solution before extrusion of the filaments can allow for control of the zeolite loading in each filament. Another important advantage of the design can be the economies of scale associated with fiber technology; fiber spinning technology is well established and understood. These beds can be cheaper and simpler to assemble as demand rises. Additionally, the contactor design can be modified to suite both PSA and TSA needs.

Figure 6F:
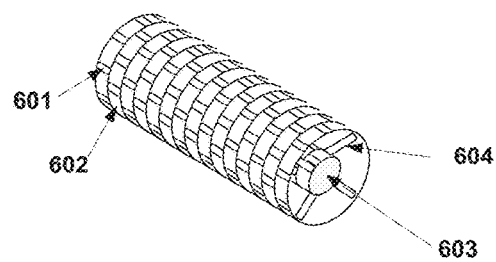

An embodiment of the disclosure can also include an adsorbent contactor. The contactor can include a gas feed stream inlet and a gas feed stream outlet, a plurality of fibers, and tortuous channels between the plurality of fibers. As discussed above, the fibers can be polymer filaments or fibers, and have adsorbent particles dispersed within the filament. The adsorbent particles can be in fluid communication with at least a portion of the tortuous channels of the adsorbent bed via the tortuous pathways of the polymer. The contactor can have hollow tubes passing through the chamber. In a temperature swing adsorption contactor, the hollow tubes can have a heat transfer fluid inlet and a heat transfer fluid outlet, and a heat transfer medium in the hollow tubes. Examples of contractors are shown in FIGS. 5E and 6F and FIGS. 6E and 6F.

An embodiment of the disclosure can also include the methods of using the adsorbent beds and contactors. The absorbent bed can be a temperature swing adsorption bed, or a pressure swing adsorption bed, or a combination thereof, including rapid cycle temperature swing adsorption beds and rapid cycle pressure swing adsorption beds. The contactor can be used in the same processes. In an embodiment, the disclosure can include a method of adsorbing a component of a medium. The method can include contacting a medium with a plurality of fibers and tortuous channels between the fibers, each of the fibers including a polymer filament and adsorbent particles dispersed within the filament, and the adsorbent particles in fluid communication with at least a portion of the tortuous channels of the adsorbent bed. A component of the medium can be selectively adsorbed from the medium with the adsorbent particles in the plurality of fibers. The method can also include further desorbing the component of the medium in another step. The term "medium" is used herein for convenience and refers generally to fluids, liquids, gases, solutions, suspensions, powders, gels, dispersions, emulsions, vapors, flowable materials, multiphase materials, or combinations thereof. Preferably the medium is a gas mixture. In some embodiments, the medium can be a flue gas, natural gas, fuel gas, bio gas, town gas, waste gas, water, coal gas, air, or a carbon dioxide containing medium. In some embodiments, the component can be $CO_2$, $SO_x$, $NO_x$, $H_2S$, and water. In a preferred embodiment, the component is $CO_2$.

EXAMPLES

Example 1

Gas Flow in a Contactor of Randomly Packed Fibers

Figure 8:
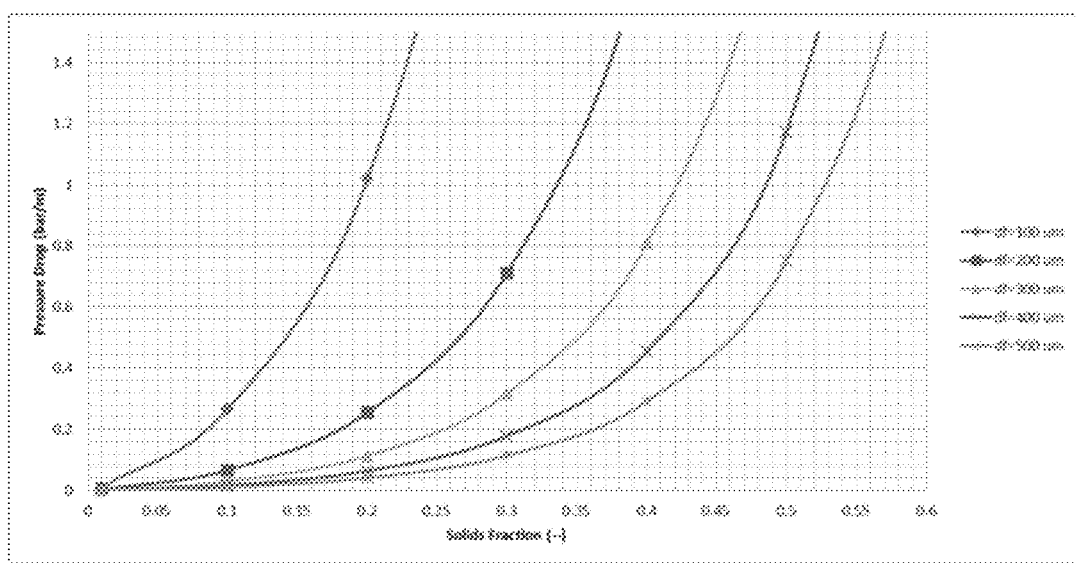
FIG. 8 illustrates a calculation of pressure drop across a non-woven bed, in accordance with an exemplary embodiment of the disclosure.

A contactor containing randomly packed adsorbent-containing fibers can be created and gas flows across the contactor measured. The tortuosity of gas channels in a bed of randomly packed fibers is expected to be large; therefore the pressure drop across the bed can be considered. FIG. 8 displays the relationship between the pressure drop across a random packing of filaments and the solids fraction of the packing. The calculation is shown for Nitrogen flowing at 20 ft/s at 15 bar and 23° C. Under the aforementioned conditions, a typical monolithic PSA bed design can give a pressure drop of 19 psi/m with a zeolite loading of 28%. On the assumption of 50 vol % zeolite loaded fibers, FIG. 8 shows that at 19 psi/m a bed consisting of a random packing of fibers with a 300 micron diameter would have a 22.5% zeolite loading, which is similar to the loading of the monolith design.

Example 2

Fabric Designs for a Pressure Swing Adsorption Process

A contactor containing a woven fabric of monofilament fibers containing an adsorbent can be created and properties calculated for gas flows around the fabric. The fabric in Example 2.1 and 2.2 in Table 1 can have a tightly woven plain weave pattern, in which warp yarns alternate over then under each weft yarn (left), whereas Example 2.3 can have a loser weave with 10 micron gap between fibers.

TABLE 1

Fabric Design specifications PSA
PSA

| Fabric Specifications | Example 2.1 | Example 2.2 | Example 2.3 |
|---|---|---|---|
| Weave Pattern | Plain | Plain | Plain |
| Filament Shape | Cylinder | Square | Cylinder |
| Fabric Dimensions L × W × H (in) | 39" × 6" × 0.024" | 39" × 6" × 0.024" | 39" × 6" × 0.024" |
| Filament Diameter (μm) | 200 | 200 | 200 |
| Filament Spacing (μm) | 0 | 0 | 10 |
| Spacer Height (μm) | 200 | 200 | 200 |
| Filament Density (Filaments/inch) | 127 | 127 | 121 |
| Tortuosity | 0.50 | 0.50 | 0.50 |
| Fabric Solids Fraction | 0.79 | 1.00 | 0.75 |
| Zeolite Loading wt % | 51% | 65% | 49% |

Example 3

Fabric Designs for a Temperature Swing Adsorption Process

A contactor containing a woven fabric of monofilament fibers containing an adsorbent can be created and properties calculated for gas flows around the fabric. Each of Example 3.1 and 3.2 shown in Table 2 shows a fabric with a tightly woven plain weave pattern, in which warp yarns alternate over then under each weft yarn. The fabric can have spacers or hollow tubes attached as in FIGS. 5 and 6 above. In each option, gas can flow over the rolled fabric, in the empty region created by the spacers or tubes, but the location of liquid flow varies. In Example 3.1, a portion of the warp yarns can be replaced with hollow polymeric water-tight tubes through which liquid can flow. The weft yarns can be adsorbent/polymer filaments, with the polymer fibers make up as little as 50% of the fabric. In Example 3.2, liquid flows through the hollow tubes that act as spacers, and the polymer/adsorbent filaments make up 100% of the fabric. In all cases, some of the fibers may be replaced with thermally conductive fibers to increase heat transfer rates if desired.

TABLE 2

Fabric Design specifications TSA
TSA

| Fabric Specifications | Example 3.1 | Example 3.2 |
|---|---|---|
| Weave Pattern | Plain | Plain |
| Filament Shape | Cylinder | Square |
| Location of Liquid Flow | Warp | Spacer |
| Fabric Dimensions L × W × H (in) | 39" × 6" × 0.024" | 39" × 6" × 0.024" |
| Filament Diameter (μm) | 200 | 200 |
| Filament Spacing (μm) | 0 | 0 |
| Liquid Flow Tube Inner Diameter (μm) | 67 | 150 |
| Spacer Height (μm) | 200 | 200 |
| Filament Density (Filaments/inch) | 127 | 127 |
| Tortuosity | 0.50 | 0.50 |
| Fabric Solids Fraction | 0.79 | 1.00 |
| Zeolite Loading wt % | 26% | 65% |

The following publications in their entireties are hereby incorporated by reference into this application as if fully set forth herein in order to more fully describe the state of the art to which the disclosed matter pertains.

Embodiments

Additionally or alternately, the disclosure can include one or more of the following embodiments.

Embodiment 1: An adsorbent bed, the bed comprising a plurality of fibers, and tortuous channels between fibers of the plurality of fibers, wherein each of the fibers comprises a polymer filament and adsorbent particles dispersed within the polymer.

Embodiment 2: An adsorbent contactor, the contractor comprising a chamber, a plurality of fibers, and tortuous channels between fibers of the plurality of fibers. The chamber comprises a gas feed stream inlet and a gas feed stream outlet. Each of the fibers comprises a polymer filament and adsorbent particles dispersed within the filament, and the adsorbent particles are in fluid communication with at least a portion of the tortuous channels of the adsorbent bed.

Embodiment 3: A method of adsorbing a component of a medium, the method comprising: contacting a medium with a plurality of fibers and tortuous channels between the fibers, and selectively adsorbing a component of the medium with the plurality of fibers. Each of the fibers comprises a polymer filament and adsorbent particles dispersed within the filament, and the adsorbent particles in fluid communication with at least a portion of the tortuous channels of the adsorbent bed. The method can further comprise desorbing the component of the medium from the plurality of fibers. The method can further include repeating the adsorbing and desorbing steps.

Embodiment 4: The adsorbent beds, adsorbent contactors and methods of any of these embodiments, wherein the adsorbent bed, contactor or method is a rapid cycle adsorbent bed, contactor, or method. The absorbent bed, contactor, or method can be a rapid cycle adsorbent with kinetic separation.

Embodiment 5: The adsorbent beds, adsorbent contactors and methods of any of these embodiments, wherein the adsorbent bed contactor or method is a pressure swing adsorbent bed, contactor, or method, a temperature swing adsorbent bed, contactor, or method, or a combination thereof. The bed or contactor can include hollow tubes, the tubes having a heat transfer fluid inlet and a heat transfer fluid outlet, and a heat transfer medium.

Embodiment 6: The adsorbent beds, adsorbent contactors and methods of any of these embodiments, where the polymer filament comprises a porous polymer, or a polymer filament comprising tortuous pathways within a porous polymer.

Embodiment 7: The adsorbent beds, adsorbent contactors and methods of any of these embodiments, wherein the adsorbent particles within the polymer are in fluid communication with at least a portion of the tortuous channels of the adsorbent bed. The fluid communication can be via the tortuous pathways of the porous polymer.

Embodiment 8: The adsorbent beds, adsorbent contactors and methods of any of these embodiments, the plurality of fibers forming a woven fabric or non-woven bed. The plurality of fibers can be a randomly packed, spirally wound, or woven into a fabric. The woven fabric can be woven fabric of filaments, the fabric having a warp and a weft, and the woven fabric forming the tortuous channels in the spacing between filaments.

Embodiment 9: The adsorbent beds, adsorbent contactors and methods of any of these embodiments, where a woven fabric of the polymer filaments can be packaged to formed, or formed into, a contacting structure. The contacting structure can include a spiral wound shape, a serpentine shape, a circular shape, or a random shape.

Embodiment 10: The adsorbent beds, adsorbent contactors and methods of any of these embodiments, wherein the contacting structure can include spacings of between about 50 micrometers and 500 micrometers, or between about 100 to about 400 micrometers, or between about 100 and about 300 micrometers, or about 200 and about 300 micrometers. These spacings can be by spacers or tubes on the fabric, or can be controlled by the self-supporting nature of the fabric.

Embodiment 11: The adsorbent beds, adsorbent contactors and methods of any of these embodiments, wherein the medium for adsorption/desorption can comprises flue gas, natural gas, fuel gas, bio gas, town gas, waste gas, water, coal gas, air, or a carbon dioxide containing medium, and the component adsorbed from the medium can be selected from $CO_2$, $SO_x$, $NO_x$, $H_2S$, and water.

Embodiment 12: The adsorbent beds, adsorbent contactors and methods of any of these embodiments, wherein the adsorbent content of the filaments is at least 10 wt %, at least 15 wt %, at least 20 wt %, at least 25 wt %, or at least 30 wt %.

Embodiment 13: The adsorbent beds, adsorbent contactors and methods of any of these embodiments, wherein the average filament diameter is less than about 1000 micrometer, less than about 800 micrometers, less than about 750, micrometers, less than about 600 micrometer, less than about 500 micrometers, less than about 400 micrometer, less than about 300 micrometers, or less than about 200 micrometers.

Embodiment 14: The adsorbent beds, adsorbent contactors and methods of any of these embodiments, wherein the size of the adsorbent particle is less than about 30% of the average diameter of the filament, or less than about 25%, or less than about 20%.

Embodiment 15: The adsorbent beds, adsorbent contactors and methods of any of these embodiments, wherein adsorbent particle can be a zeolite, metal oxide, metal organic framework, zeolitic imidozolate framework, or activated carbons. Preferably, the adsorbent can be a zeolite. The zeolite can be any zeolite used in an adsorption process, including but not limited to zeolite A, zeolite X, zeolite Y, MFI, DDR, ZSM-58, mordenite, silicalite, chabasite, faujasite, and variations of these frameworks.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

What is claimed is:

1. An adsorbent bed, the bed comprising,
a plurality of fibers, and
tortuous channels between fibers of the plurality of fibers;
wherein each of the fibers comprises a polymer filament and adsorbent particles dispersed within the polymer filament;
the polymer filament is porous with a void fraction of at least about 10% volume and is selected from the group consisting of polysulfones, polydimehtylsiloxanes, polyetherimides, and polyether ketones; wherein the void fraction is comprised of pores wherein 1) the pores are produced using a gaseous porogen, a diffusible porogen, or an extractable porogen, or 2) the pores are produced during spinning of the polymer filament by phase inversion, wherein a solvent is removed causing pores to be formed in the polymer filament; and
wherein the plurality of fibers are randomly packed, spirally wound, or woven into a fabric.

2. The bed of claim 1, wherein the bed is a rapid cycle adsorbent bed.

3. The bed of claim 1, wherein the polymer filament comprises tortuous pathways within a porous polymer.

4. The bed of claim 1, wherein the adsorbent particles within the polymer are in fluid communication with at least a portion of the tortuous channels of the adsorbent bed.

5. The bed of claim 1, wherein the adsorbent content of the filaments is at least 10 wt %.

6. The bed of claim 1, wherein the average filament diameter is less than 500 micrometers.

7. The bed of claim 1, wherein the average size of the adsorbent particle is less than 30% of the average diameter of the filament.

8. The bed of claim 1, wherein the adsorbent bed comprises a pressure swing adsorption bed.

9. The bed of claim 1, wherein the plurality of fibers forms a non-woven bed of randomly packed filaments.

10. The bed of claim 1, wherein the plurality of fibers forms a bed of spirally wound filaments.

11. The bed of claim 1, wherein the plurality of fibers form a woven fabric of filaments, the fabric having a warp and a weft, and the woven fabric forming the tortuous channels in the spacing between filaments.

12. The bed of claim 11, wherein the woven fabric is packaged to form a contacting structure.

13. The bed of claim 12, wherein the contacting structure includes spacers of between about 50 micrometers and 500 micrometers.

14. An adsorbent contactor, the contactor comprising
a chamber comprising:
a gas feed stream inlet and a gas feed stream outlet;
a plurality of fibers; and
tortuous channels between fibers of the plurality of fibers;
wherein each of the fibers comprises a polymer filament and adsorbent particles dispersed within the filament, the adsorbent particles being in fluid communication with at least a portion of the tortuous channels of the adsorbent bed, and the polymer filament is porous with a void fraction of at least about 10% volume and is selected from the group consisting of polysulfones, polydimehtylsiloxanes, polyetherimides, and polyether ketones; wherein the void fraction is comprised of pores wherein 1) the pores are produced using a gaseous porogen, a diffusible porogen, or an extractable porogen, or 2) the pores are produced during spinning of the polymer filament by phase inversion, wherein a solvent is removed causing pores to be formed in the polymer filament; and
wherein the plurality of fibers are randomly packed, spirally wound, or woven into a fabric.

15. The contactor of claim 14, wherein the adsorbent contactor is a rapid cycle adsorbent contactor.

16. The contactor of claim 14, wherein the polymer filament comprises a porous polymer having tortuous pathways within the porous polymer.

17. The contactor of claim 14, wherein the adsorbent bed is a pressure swing adsorption bed.

18. The contactor of claim 14, wherein the adsorbent content of the filaments is at least 10 wt %.

19. The contactor of claim 14, wherein the average filament diameter is less than 500 micrometers.

20. The contactor of claim 14, wherein the plurality of fibers forms a bed of non-woven randomly packed or spirally wound filaments, optionally supported on structural supports within the chamber, and the tortuous channels form between the randomly packed filaments.

21. The contactor of claim 14, wherein the plurality of fibers form a woven fabric of filaments, the fabric having a warp and a weft, and the woven fabric forming the tortuous channels in the spacing between filaments.

22. The contactor of claim 21, wherein the woven fabric is packaged to form a contacting structure.

23. The contactor of claim 22, wherein the contacting fabric includes spacers of between about 50 micrometers and 500 micrometers.

24. A method of adsorbing a component of a medium within an adsorbent bed, the method comprising:
contacting a medium with a plurality of fibers and tortuous channels between the fibers, each of the fibers comprising a polymer filament and adsorbent particles dispersed within the filament, the adsorbent particles in fluid communication with at least a portion of the tortuous channels of the adsorbent bed, and the plurality of fibers are randomly packed, spirally wound, or woven into a fabric; and
selectively adsorbing a component of the medium with the plurality of fibers;
wherein the polymer filament is porous with a void fraction of at least about 10% volume and is selected from the group consisting of polysulfones, polydimehtylsiloxanes, polyetherimides, and polyether ketones; wherein the void fraction is comprised of pores wherein 1) the pores are produced using a gaseous porogen, a diffusible porogen, or an extractable porogen, or 2) the pores are produced during spinning of the polymer filament by phase inversion, wherein a solvent is removed causing pores to be formed in the polymer filament.

25. The method of adsorbing a component of a medium of claim 24, further comprising desorbing the component of the medium.

26. The method of adsorbing a component of a medium of claim 25, further comprising repeating the contacting and adsorbing.

27. The method of adsorbing a component of a medium of claim 24, wherein the medium comprises flue gas, natural gas, fuel gas, bio gas, town gas, waste gas, water, coal gas, air, or a carbon dioxide containing medium.

28. The method of adsorbing a component of a medium of claim 24, wherein the component is selected from $CO_2$, $SO_x$, $NO_x$, $H_2S$, and water.

29. The method of adsorbing a component of a medium of claim 24, wherein the plurality of fibers forms a bed of randomly packed or spirally wound filaments optionally supported on structural support.

30. The method of adsorbing a component of a medium of claim 24, wherein the plurality of fibers forms a woven fabric of filaments, the fabric having a warp and a weft, and the woven fabric forming the tortuous channels in the spacing between filaments.

31. The method of adsorbing a component of a medium of claim 24, wherein the method is a pressure swing adsorption process.

32. The method of adsorbing a component of a medium of claim 24, wherein the method is a rapid cycle adsorption process.

33. The method of adsorbing a component of a medium of claim 24, wherein the method is a rapid cycle adsorption process with kinetic separation.

* * * * *